United States Patent
Park et al.

(10) Patent No.: US 8,527,458 B2
(45) Date of Patent: Sep. 3, 2013

(54) LOGGING FRAMEWORK FOR A DATA STREAM PROCESSING SERVER

(75) Inventors: Hoyong Park, San Jose, CA (US); Parul Jain, Mountain View, CA (US); Namit Jain, Santa Clara, CA (US); Anand Srinivasan, Bangalore (IN); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 688 days.

(21) Appl. No.: 12/534,384

(22) Filed: Aug. 3, 2009

(65) Prior Publication Data

US 2011/0029484 A1    Feb. 3, 2011

(51) Int. Cl.
*G06F 7/00* (2006.01)
*G06F 17/00* (2006.01)
*G06F 17/30* (2006.01)

(52) U.S. Cl.
USPC ............................ 707/634; 707/713; 707/718

(58) Field of Classification Search
USPC ......................................... 707/634, 713, 718
See application file for complete search history.

(56) References Cited

U.S. PATENT DOCUMENTS

| | | | |
|---|---|---|---|
| 4,996,687 A | 2/1991 | Hess et al. | |
| 5,051,947 A | 9/1991 | Messenger et al. | |
| 5,495,600 A | 2/1996 | Terry et al. | |
| 5,706,494 A | 1/1998 | Cochrane et al. | |
| 5,802,262 A | 9/1998 | Van De Vanter | |
| 5,802,523 A | 9/1998 | Jasuja et al. | |
| 5,822,750 A | 10/1998 | Jou et al. | |
| 5,826,077 A | 10/1998 | Blakeley et al. | |
| 5,850,544 A | 12/1998 | Parvathaneny et al. | |
| 5,857,182 A | 1/1999 | DeMichiel et al. | |
| 5,937,401 A | 8/1999 | Hillegas | |
| 6,006,235 A | 12/1999 | Macdonald et al. | |
| 6,011,916 A | 1/2000 | Moore et al. | |
| 6,041,344 A | 3/2000 | Bodamer et al. | |
| 6,081,801 A | 6/2000 | Cochrane et al. | |

(Continued)

FOREIGN PATENT DOCUMENTS

| | | |
|---|---|---|
| EP | 1241589 A2 | 9/2002 |
| WO | WO 00/49533 A2 | 8/2000 |

(Continued)

OTHER PUBLICATIONS

"StreamBase New and Noteworthy," StreamBase, dated Jan. 12, 2010, 878 pages.

(Continued)

*Primary Examiner* — Tony Mahmoudi
*Assistant Examiner* — Merilyn Nguyen
(74) *Attorney, Agent, or Firm* — Kilpatrick Townsend & Stockton LLP

(57) ABSTRACT

Techniques for logging data pertaining to the operation of a data stream processing server. In one set of embodiments, logging configuration information can be received specifying a functional area of a data stream processing server to be logged. Based on the logging configuration information, logging can be dynamically enabled for objects associated with the functional area that are instantiated by the data stream processing server, and logging can be dynamically disabled for objects associated with the functional area that are discarded (or no longer used) by the data stream processing server. In another set of embodiments, a tool can be provided for visualizing the data logged by the data stream processing server.

20 Claims, 13 Drawing Sheets

(56) References Cited

U.S. PATENT DOCUMENTS

| | | | |
|---|---|---|---|
| 6,092,065 A | 7/2000 | Floratos et al. | |
| 6,108,666 A | 8/2000 | Floratos et al. | |
| 6,128,610 A | 10/2000 | Srinivasan et al. | |
| 6,263,332 B1 | 7/2001 | Nasr et al. | |
| 6,278,994 B1 | 8/2001 | Fuh et al. | |
| 6,282,537 B1 | 8/2001 | Madnick et al. | |
| 6,353,821 B1 | 3/2002 | Gray | |
| 6,367,034 B1 | 4/2002 | Novik et al. | |
| 6,370,537 B1 | 4/2002 | Gilbert et al. | |
| 6,389,436 B1 | 5/2002 | Chakrabarti et al. | |
| 6,418,448 B1 | 7/2002 | Sarkar | |
| 6,438,540 B2 | 8/2002 | Nasr et al. | |
| 6,449,620 B1 | 9/2002 | Draper et al. | |
| 6,453,314 B1 | 9/2002 | Chan et al. | |
| 6,507,834 B1 | 1/2003 | Kabra et al. | |
| 6,523,102 B1 | 2/2003 | Dye et al. | |
| 6,546,381 B1 | 4/2003 | Subramanian et al. | |
| 6,708,186 B1 | 3/2004 | Claborn et al. | |
| 6,718,278 B1 | 4/2004 | Steggles | |
| 6,748,386 B1 | 6/2004 | Li | |
| 6,751,619 B1 | 6/2004 | Rowstron et al. | |
| 6,766,330 B1 | 7/2004 | Chen et al. | |
| 6,785,677 B1 | 8/2004 | Fritchman | |
| 6,826,566 B2 | 11/2004 | Lewak et al. | |
| 6,836,778 B2 | 12/2004 | Manikutty et al. | |
| 6,856,981 B2 | 2/2005 | Wyschogrod et al. | |
| 6,985,904 B1 | 1/2006 | Kaluskar et al. | |
| 7,020,696 B1 | 3/2006 | Perry et al. | |
| 7,093,023 B2 | 8/2006 | Lockwood et al. | |
| 7,145,938 B2 | 12/2006 | Takeuchi et al. | |
| 7,146,352 B2 | 12/2006 | Brundage et al. | |
| 7,224,185 B2 | 5/2007 | Campbell et al. | |
| 7,225,188 B1 | 5/2007 | Gai et al. | |
| 7,236,972 B2 | 6/2007 | Lewak et al. | |
| 7,305,391 B2 | 12/2007 | Wyschogrod et al. | |
| 7,308,561 B2 | 12/2007 | Cornet et al. | |
| 7,310,638 B1 | 12/2007 | Blair | |
| 7,376,656 B2 | 5/2008 | Blakeley et al. | |
| 7,383,253 B1 | 6/2008 | Tsimelzon et al. | |
| 7,403,959 B2 | 7/2008 | Nishizawa et al. | |
| 7,430,549 B2 | 9/2008 | Zane et al. | |
| 7,451,143 B2 | 11/2008 | Sharangpani et al. | |
| 7,483,976 B2 | 1/2009 | Ross | |
| 7,516,121 B2 | 4/2009 | Liu et al. | |
| 7,519,577 B2 | 4/2009 | Brundage et al. | |
| 7,552,365 B1 | 6/2009 | March et al. | |
| 7,567,953 B2 | 7/2009 | Kadayam et al. | |
| 7,580,946 B2 | 8/2009 | Mansour et al. | |
| 7,613,848 B2 | 11/2009 | Amini et al. | |
| 7,620,851 B1 | 11/2009 | Leavy et al. | |
| 7,630,982 B2 | 12/2009 | Boyce | |
| 7,634,501 B2 | 12/2009 | Yabloko | |
| 7,636,703 B2 | 12/2009 | Taylor | |
| 7,673,065 B2 | 3/2010 | Srinivasan et al. | |
| 7,676,461 B2 | 3/2010 | Chikodrov et al. | |
| 7,689,622 B2 | 3/2010 | Liu et al. | |
| 7,702,629 B2 | 4/2010 | Cytron et al. | |
| 7,702,639 B2 | 4/2010 | Stanley et al. | |
| 7,716,210 B2 | 5/2010 | Ozcan et al. | |
| 7,739,265 B2 | 6/2010 | Jain et al. | |
| 7,805,445 B2 | 9/2010 | Boyer et al. | |
| 7,814,111 B2 | 10/2010 | Levin | |
| 7,823,066 B1 | 10/2010 | Kuramura | |
| 7,827,146 B1 | 11/2010 | De Landstheer et al. | |
| 7,827,190 B2 | 11/2010 | Pandya | |
| 7,844,829 B2 | 11/2010 | Meenakshisundaram | |
| 7,870,124 B2 | 1/2011 | Liu et al. | |
| 7,912,853 B2 | 3/2011 | Agrawal | |
| 7,917,299 B2 | 3/2011 | Buhler et al. | |
| 7,930,322 B2 | 4/2011 | MacLennan | |
| 7,953,728 B2 | 5/2011 | Hu et al. | |
| 7,979,420 B2 | 7/2011 | Jain et al. | |
| 7,991,766 B2 | 8/2011 | Srinivasan et al. | |
| 7,996,388 B2 * | 8/2011 | Jain et al. | 707/718 |
| 8,019,747 B2 | 9/2011 | Srinivasan et al. | |
| 8,032,544 B2 | 10/2011 | Jing et al. | |
| 8,099,400 B2 | 1/2012 | Haub et al. | |
| 8,134,184 B2 | 3/2012 | Becker et al. | |
| 8,155,880 B2 | 4/2012 | Patel et al. | |
| 8,296,316 B2 * | 10/2012 | Jain et al. | 707/769 |
| 2002/0023211 A1 | 2/2002 | Roth et al. | |
| 2002/0032804 A1 | 3/2002 | Hunt | |
| 2002/0049788 A1 | 4/2002 | Lipkin et al. | |
| 2002/0116371 A1 | 8/2002 | Dodds et al. | |
| 2002/0133484 A1 | 9/2002 | Chau et al. | |
| 2002/0169788 A1 | 11/2002 | Lee et al. | |
| 2003/0037048 A1 | 2/2003 | Kabra et al. | |
| 2003/0046673 A1 | 3/2003 | Copeland et al. | |
| 2003/0065655 A1 | 4/2003 | Syeda-Mahmood | |
| 2003/0065659 A1 | 4/2003 | Agarwal et al. | |
| 2003/0135304 A1 | 7/2003 | Sroub et al. | |
| 2003/0200198 A1 | 10/2003 | Chandrasekar et al. | |
| 2003/0229652 A1 | 12/2003 | Bakalash et al. | |
| 2003/0236766 A1 | 12/2003 | Fortuna et al. | |
| 2004/0010496 A1 | 1/2004 | Behrendt et al. | |
| 2004/0024773 A1 | 2/2004 | Stoffel et al. | |
| 2004/0064466 A1 | 4/2004 | Manikutty et al. | |
| 2004/0073534 A1 | 4/2004 | Robson | |
| 2004/0117359 A1 | 6/2004 | Snodgrass et al. | |
| 2004/0153329 A1 | 8/2004 | Casati et al. | |
| 2004/0167864 A1 | 8/2004 | Wang et al. | |
| 2004/0168107 A1 | 8/2004 | Sharp et al. | |
| 2004/0177053 A1 | 9/2004 | Donoho et al. | |
| 2004/0220912 A1 | 11/2004 | Manikutty et al. | |
| 2004/0220927 A1 | 11/2004 | Murthy et al. | |
| 2004/0267760 A1 | 12/2004 | Brundage et al. | |
| 2005/0010896 A1 | 1/2005 | Meliksetian et al. | |
| 2005/0055338 A1 | 3/2005 | Warner et al. | |
| 2005/0065949 A1 | 3/2005 | Warner et al. | |
| 2005/0096124 A1 | 5/2005 | Stronach | |
| 2005/0097128 A1 | 5/2005 | Ryan et al. | |
| 2005/0154740 A1 | 7/2005 | Day et al. | |
| 2005/0174940 A1 | 8/2005 | Iny | |
| 2005/0177579 A1 | 8/2005 | Blakeley et al. | |
| 2005/0204340 A1 | 9/2005 | Ruminer et al. | |
| 2005/0229158 A1 | 10/2005 | Thusoo et al. | |
| 2005/0273450 A1 | 12/2005 | McMillen et al. | |
| 2006/0015482 A1 | 1/2006 | Beyer et al. | |
| 2006/0031204 A1 | 2/2006 | Liu et al. | |
| 2006/0080646 A1 | 4/2006 | Aman | |
| 2006/0085592 A1 * | 4/2006 | Ganguly et al. | 711/114 |
| 2006/0100969 A1 | 5/2006 | Wang et al. | |
| 2006/0106786 A1 * | 5/2006 | Day et al. | 707/4 |
| 2006/0106797 A1 | 5/2006 | Srinivasa et al. | |
| 2006/0155719 A1 | 7/2006 | Mihaeli et al. | |
| 2006/0212441 A1 | 9/2006 | Tang et al. | |
| 2006/0224576 A1 | 10/2006 | Liu et al. | |
| 2006/0230029 A1 | 10/2006 | Yan | |
| 2006/0235840 A1 | 10/2006 | Manikutty et al. | |
| 2006/0242180 A1 | 10/2006 | Graf et al. | |
| 2006/0294095 A1 | 12/2006 | Berk et al. | |
| 2007/0016467 A1 | 1/2007 | John et al. | |
| 2007/0022092 A1 | 1/2007 | Nishizawa et al. | |
| 2007/0039049 A1 | 2/2007 | Kupferman et al. | |
| 2007/0050340 A1 | 3/2007 | von Kaenel et al. | |
| 2007/0118600 A1 | 5/2007 | Arora | |
| 2007/0136239 A1 | 6/2007 | Lee et al. | |
| 2007/0136254 A1 | 6/2007 | Choi et al. | |
| 2007/0192301 A1 | 8/2007 | Posner | |
| 2007/0226188 A1 | 9/2007 | Johnson et al. | |
| 2007/0226239 A1 | 9/2007 | Johnson et al. | |
| 2007/0271280 A1 | 11/2007 | Chandasekaran | |
| 2007/0294217 A1 | 12/2007 | Chen et al. | |
| 2008/0005093 A1 | 1/2008 | Liu et al. | |
| 2008/0010241 A1 | 1/2008 | McGoveran | |
| 2008/0016095 A1 | 1/2008 | Bhatnagar et al. | |
| 2008/0028095 A1 | 1/2008 | Lang et al. | |
| 2008/0034427 A1 | 2/2008 | Cadambi et al. | |
| 2008/0046401 A1 | 2/2008 | Lee et al. | |
| 2008/0077570 A1 | 3/2008 | Tang et al. | |
| 2008/0077587 A1 | 3/2008 | Wyschogrod et al. | |
| 2008/0082484 A1 | 4/2008 | Averbuch et al. | |
| 2008/0082514 A1 | 4/2008 | Khorlin et al. | |
| 2008/0086321 A1 | 4/2008 | Walton | |

| | | | |
|---|---|---|---|
| 2008/0114787 A1 | 5/2008 | Kashiyama et al. | |
| 2008/0120283 A1 | 5/2008 | Liu et al. | |
| 2008/0195577 A1 | 8/2008 | Fan et al. | |
| 2008/0235298 A1 | 9/2008 | Lin et al. | |
| 2008/0255847 A1 | 10/2008 | Moriwaki et al. | |
| 2008/0281782 A1 | 11/2008 | Agrawal | |
| 2008/0301124 A1 | 12/2008 | Alves et al. | |
| 2008/0301125 A1 | 12/2008 | Alves et al. | |
| 2008/0301135 A1 | 12/2008 | Alves et al. | |
| 2008/0301256 A1 | 12/2008 | McWilliams et al. | |
| 2009/0006320 A1 | 1/2009 | Ding et al. | |
| 2009/0006346 A1 | 1/2009 | C N et al. | |
| 2009/0007098 A1 | 1/2009 | Chevrette et al. | |
| 2009/0019045 A1 | 1/2009 | Amir et al. | |
| 2009/0043729 A1 | 2/2009 | Liu et al. | |
| 2009/0070785 A1 | 3/2009 | Alvez et al. | |
| 2009/0070786 A1* | 3/2009 | Alves et al. | 719/318 |
| 2009/0076899 A1 | 3/2009 | Gbodimowo | |
| 2009/0100029 A1 | 4/2009 | Jain et al. | |
| 2009/0106189 A1 | 4/2009 | Jain et al. | |
| 2009/0106190 A1* | 4/2009 | Srinivasan et al. | 707/2 |
| 2009/0106198 A1 | 4/2009 | Srinivasan et al. | |
| 2009/0106214 A1* | 4/2009 | Jain et al. | 707/4 |
| 2009/0106215 A1 | 4/2009 | Jain et al. | |
| 2009/0106218 A1 | 4/2009 | Srinivasan et al. | |
| 2009/0106321 A1* | 4/2009 | Das et al. | 707/200 |
| 2009/0106440 A1 | 4/2009 | Srinivasan et al. | |
| 2009/0112802 A1 | 4/2009 | Srinivasan et al. | |
| 2009/0112803 A1 | 4/2009 | Srinivasan et al. | |
| 2009/0112853 A1 | 4/2009 | Nishizawa et al. | |
| 2009/0125550 A1 | 5/2009 | Barga et al. | |
| 2009/0144696 A1 | 6/2009 | Andersen | |
| 2009/0187584 A1 | 7/2009 | Johnson et al. | |
| 2009/0216747 A1 | 8/2009 | Li et al. | |
| 2009/0216860 A1 | 8/2009 | Li et al. | |
| 2009/0228434 A1* | 9/2009 | Krishnamurthy et al. | 707/2 |
| 2009/0245236 A1* | 10/2009 | Scott et al. | 370/352 |
| 2009/0248749 A1 | 10/2009 | Gu et al. | |
| 2009/0265324 A1* | 10/2009 | Mordvinov et al. | 707/4 |
| 2009/0293046 A1 | 11/2009 | Cheriton | |
| 2009/0300093 A1 | 12/2009 | Griffiths et al. | |
| 2009/0300181 A1 | 12/2009 | Marques | |
| 2009/0327102 A1 | 12/2009 | Maniar et al. | |
| 2010/0017379 A1 | 1/2010 | Naibo et al. | |
| 2010/0017380 A1 | 1/2010 | Naibo et al. | |
| 2010/0023498 A1 | 1/2010 | Dettinger et al. | |
| 2010/0049710 A1 | 2/2010 | Young, Jr. et al. | |
| 2010/0057663 A1 | 3/2010 | Srinivasan et al. | |
| 2010/0057727 A1 | 3/2010 | Srinivasan et al. | |
| 2010/0057735 A1 | 3/2010 | Srinivasan et al. | |
| 2010/0057736 A1 | 3/2010 | Srinivasan et al. | |
| 2010/0057737 A1 | 3/2010 | Srinivasan et al. | |
| 2010/0094838 A1 | 4/2010 | Kozak | |
| 2010/0161589 A1* | 6/2010 | Nica et al. | 707/713 |
| 2010/0223305 A1 | 9/2010 | Park et al. | |
| 2010/0223437 A1 | 9/2010 | Park et al. | |
| 2010/0223606 A1 | 9/2010 | Park et al. | |
| 2010/0318652 A1 | 12/2010 | Samba | |
| 2011/0022618 A1 | 1/2011 | Thatte et al. | |
| 2011/0023055 A1 | 1/2011 | Thatte et al. | |
| 2011/0029484 A1 | 2/2011 | Park et al. | |
| 2011/0029485 A1 | 2/2011 | Park et al. | |
| 2011/0055192 A1 | 3/2011 | Tang et al. | |
| 2011/0093162 A1 | 4/2011 | Nielsen et al. | |
| 2011/0161321 A1 | 6/2011 | de Castro Alves et al. | |
| 2011/0161328 A1 | 6/2011 | Park et al. | |
| 2011/0161352 A1 | 6/2011 | de Castro Alves et al. | |
| 2011/0161356 A1 | 6/2011 | de Castro Alves et al. | |
| 2011/0173231 A1 | 7/2011 | Drissi et al. | |
| 2011/0173235 A1 | 7/2011 | Aman et al. | |
| 2011/0196891 A1 | 8/2011 | de Castro Alves et al. | |
| 2011/0270879 A1 | 11/2011 | Srinivasan et al. | |
| 2011/0321057 A1 | 12/2011 | Mejdrich et al. | |
| 2012/0041934 A1 | 2/2012 | Srinivasan et al. | |
| 2012/0130963 A1 | 5/2012 | Luo et al. | |

FOREIGN PATENT DOCUMENTS

| | | |
|---|---|---|
| WO | WO 01/59602 A2 | 8/2001 |
| WO | WO 01/65418 A2 | 9/2001 |
| WO | WO 03/030031 A2 | 4/2003 |

OTHER PUBLICATIONS

Non-Final Office Action for U.S. Appl. No. 12/548,187, mailed on Sep. 27, 2011, 19 pages.
Final Office Action for U.S. Appl. No. 12/395,871, mailed on Oct. 19, 2011, 33 pages.
Non-Final Office Action for U.S. Appl. No. 12/548,222, mailed on Oct. 19, 2011, 27 pages.
Non-Final Office Action for U.S. Appl. No. 12/548,281, mailed on Oct. 3, 2011, 37 pages.
Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
Abadi, et al., "Aurora: A Data Stream Management System," International Conference on Management of Data, Proceedings of the 2003 ACM SIGMOD International Conference on Management of Data, ACM Press, 2003, 4 pages.
Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.
Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "STREAM: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.

Chen, et al., "NiagaraCQ: A Scalable Continuous Query System for Internet Databases," Proceedings of the 2000 SIGMOD International Conference on Management of Data, May 2000, pp. 379-390.

Colyer, et al., "Spring Dynamic Modules Reference Guide," Copyright 2006-2008, ver. 1.0.3, 73 pages.

Colyer, et al., "Spring Dynamic Modules Reference Guide," Copyright 2006-2008, ver. 1.1.3, 96 pages.

"Complex Event Processing in the Real World," an Oracle White Paper, Sep. 2007, 13 pages.

Conway, "An Introduction to Data Stream Query Processing," Truviso, Inc., May 24, 2007, at URL: http://neilconway.org/talks/stream_intro.pdf, 71 pages.

"Coral8 Complex Event Processing Technology Overview," Coral8, Inc., Make it Continuous, pp. 1-8, Copyright 2007, Coral8, Inc.

"Creating WebLogic Domains Using the Configuration Wizard," BEA Products, Dec. 2007, ver. 10.0, 78 pages.

"Creating Weblogic Event Server Applications," BEA WebLogic Event Server, Jul. 2007, ver. 2.0, 90 pages.

Demers, et al., "Towards Expressive Publish/Subscribe Systems," Proceedings of the 10th International Conference on Extending Database Technology (EDBT 2006), Munich, Germany, Mar. 2006, pp. 1-18.

DeMichiel, et al., "JSR 220: Enterprise JavaBeans™, EJB 3.0 Simplified API," EJB 3.0 Expert Group, Sun Microsystems, May 2, 2006, ver. 3.0, 59 pages.

"Dependency Injection," Wikipedia, Dec. 30, 2008, printed on Apr. 29, 2011, at URL: http:en.wikipedia.org/w/index.php?title=Dependency_injection&oldid=260831402, pp. 1-7.

"Deploying Applications to WebLogic Server," BEA WebLogic Server, Mar. 30, 2007, ver. 10.0, 164 pages.

Deshpande, et al., "Adaptive Query Processing," slide show believed to be prior to Oct. 17, 2007, 27 pages.

"Developing Applications with Weblogic Server," BEA WebLogic Server, Mar. 30, 2007, ver. 10.0, 254 pages.

Diao, "Query Processing for Large-Scale XML Message Brokering," 2005, University of California Berkeley, 226 pages.

Diao, et al. "Query Processing for High-Volume XML Message Brokering", Proceedings of the 29th VLDB Conference, Berlin, Germany, 2003, 12 pages.

Dindar, et al., "Event Processing Support for Cross-Reality Environments," Pervasive Computing, IEEE CS, Jul.-Sep. 2009, pp. 2-9, Copyright 2009, IEEE.

"EPL Reference," BEA WebLogic Event Server, Jul. 2007, ver. 2.0, 82 pages.

Esper Reference Documentation, Copyright 2007, ver. 1.12.0, 158 pages.

Esper Reference Documentation, Copyright 2008, ver. 2.0.0, 202 pages.

"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.

Fernandez, et al., "Build your own XQuery processor", slide show, at URL: http://www.galaxquery.org/slides/edbt-summer-school2004.pdf, 2004, 116 pages.

Fernandez, et al., Implementing XQuery 1.0: The Galax Experience:, Proceedings of the 29th VLDB Conference, Berlin, Germany, 2003, 4 pages.

Florescu, et al., "The BEA/XQRL Streaming XQuery Processor," Proceedings of the 29th VLDB Conference, 2003, Berlin, Germany, 12 pages.

"Getting Started with WebLogic Event Server," BEA WebLogic Event Server, Jul. 2007, ver. 2.0, 66 pages.

Gilani, "Design and implementation of stream operators, query instantiator and stream buffer manager," Dec. 2003, 137 pages.

Golab, "Sliding Window Query Processing Over Data Streams," University of Waterloo, Waterloo, Ont. Canada, Aug. 2006, 182 pages.

Golab, et al., "Issues in Data Stream Management," ACM SIGMOD Record, vol. 32, issue 2, Jun. 2003, ACM Press, pp. 5-14.

Gosling, et al., "The Java Language Specification," Book, copyright 1996-2005, 3rd edition, 684 pages, Sun Microsystems USA. (due to size, reference will be uploaded in two parts).

Hopcroft, "Introduction to Automata Theory, Languages, and Computation," Second Edition, Addison-Wesley, Copyright 2001, 524 pages. (due to size, reference will be uploaded in two parts).

"Installing Weblogic Real Time," BEA WebLogic Real Time, Jul. 2007, ver. 2.0, 64 pages.

"Introduction to BEA WebLogic Server and BEA WebLogic Express," BEA WebLogic Server, Mar. 2007, ver. 10.0, 34 pages.

"Introduction to WebLogic Real Time," BEA WebLogic Real Time, Jul. 2007, ver. 2.0, 20 pages.

"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.

Jin, et al. "ARGUS: Efficient Scalable Continuous Query Optimization for Large-Volume Data Streams" 10th International Database Engineering and Applications Symposium (IDEAS'06), 2006, 7 pages.

Kawaguchi, "Java Architecture for XML Binding_(JAXB) 2.0," Sun Microsystems, Inc., Apr. 19, 2006, 384 pages.

Knuth, et al., "Fast Pattern Matching in Strings," SIAM J. Comput., vol. 6, No. 2, Jun. 1977, pp. 323-350.

Lakshmanan, et al., "On efficient matching of streaming XML documents and queries," 2002, 18 pages.

Lindholm, et al., "Java Virtual Machine Specification, 2nd Edition", Prentice Hall, Apr. 1999, 484 pages. (due to size, reference will be uploaded in two parts).

Liu, et al., "Efficient XSLT Processing in Relational Database System," Proceeding of the 32nd. International Conference on Very Large Data Bases (VLDB), Sep. 2006, 1106-1116, 11 pages.

Luckham, "What's the Difference Between ESP and CEP?" Complex Event Processing, downloaded Apr. 29, 2011, at URL: http://complexevents.com/?p=103, 5 pages.

Madden, et al., "Continuously Adaptive Continuous Queries (CACQ) over Streams," SIGMOD 2002, Jun. 4-6, 2002, 12 pages.

"Managing Server Startup and Shutdown," BEA WebLogic Server, Mar. 30, 2007, ver. 10.0, 134 pages.

"Matching Behavior," .NET Framework Developers Guide, Copyright 2008 Microsoft Corporation, downloaded Jul. 1, 2008 from URL: http://msdn.microsoft.com/en-us/library/0yzc2yb0(printer).aspx, pp. 1-2.

Motwani, et al., "Models and Issues in Data Streams," Proceedings of the 21st ACM SIGMOD-SIGACT-SIDART symposium on Principles f database systems, 2002, 30 pages.

Motwani, et al., "Query Processing Resource Management, and Approximation in a Data Stream Management System," Proceedings of CIDR 2003, Jan. 2003, 12 pages.

Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.

"New Project Proposal for Row Pattern Recognition—Amendment to SQL with Application to Streaming Data Queries," H2-2008-027, H2 Teleconference Meeting, Jan. 9, 2008, pp. 1-6.

Novick, "Creating a User Defined Aggregate with SQL Server 2005," at URL: http://novicksoftware.com/Articles/sql-2005-product-user-defined-aggregate.html, 2005, 6 pages.

Oracle Database, SQL Language Reference, 11g Release 1 (11.1), B28286-02, Sep. 2007, 1496 pages, Oracle.

Oracle Application Server 10g, Release 2 and 3, New Features Overview, An Oracle White Paper, Oct. 2005, 48 pages, Oracle.

Oracle Application Server, Administrator's Guide, 10g Release 3 (10.1.3.2.0), B32196-01, Jan. 2007, 376 pages, Oracle.

Oracle Application Server, Enterprise Deployment Guide, 10g Release 3 (10.1.3.2.0), B32125-02, Apr. 2007, 120 pages, Oracle.

Oracle Application Server, High Availability Guide, 10g Release 3 (10.1.3.2.0), B32201-01, Jan. 2007, 314 pages, Oracle.

"Oracle CEP Getting Started," Release 11gR1 (11.1.1) E14476-01, May 2009, 172 pages.

Oracle Database Data Cartridge Developer's Guide, B28425-03, 11g Release 1 (11.1), Oracle, Mar. 2008, 372 pages, Oracle.

Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).
"OSGI Service Platform Core Specification, The OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke, "XML Query," Mar. 14, 2004, 29 pages.
De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874,896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.

Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948,523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
Hao et al. "Achieving high performance web applications by service and database replications at edge servers," proceedings of IPCCC 2009, IEEE 28th International Performance Computing and Communications Conference, pp. 153-160 (Dec. 2009).
International Search Report dated for PCT/US2011/052019 (Nov. 17, 2011).
Office Action for U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
"Oracle Complex Event Processing CQL Language Reference," 11g Release 1 (11.1.1) E12048-01, Apr. 2010, 540 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Office Action for U.S. Appl. No. 12/506,905 (Mar. 26, 2012).
Office Action for U.S. Appl. No. 12/548,209 (Apr. 16, 2012).
Notice of Allowance for U.S. Appl. No. 13/184,528 (Mar. 1, 2012).
Sansoterra "Empower SOL with Java User-Defined Functions," IT Jungle.com (Oct. 9, 2003).
Ullman et al., "Introduction to JDBC," Stanford University (2005).
Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
Non-Final Office Action for U.S. Appl. No. 12/957,201 dated Dec. 19, 2012.
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/548,222 (Jun. 20, 2012).
Office Action for U.S. Appl. No. 12/534,398 (Jun. 5, 2012).
Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22 2012).
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. No. 12/548,209 dated Oct. 24, 2012.
Nah et al. "A Cluster-Based THO-Structured Scalable Approach for Location Information Systems," The Ninth IEEE International Workshop on Object-Oriented Real-Time Dependable Systems (WORDS' 03), pp. 225-233 (Jan. 1, 2003).
Hulton et al. "Mining Time-Changing Data Streams," Proceedings of the Seventh ACM SIGKDD, pp. 10 (Aug. 2001).
Stump et al. (ed.) Proceedings of IJCAR '06 Workshop "PLPV '06: Programming Languages meets Program Verification," pp. 1-113 (Aug. 21, 2006).
Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
Wu et al."Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
Final Office Action for U.S. Appl. No. 12/396,464 dated Jan. 16, 2013, 16 pages.
Final Office Action for U.S. Appl. No. 12/913,636 dated Jan. 8, 2013, 20 pages.
Non-Final Office Action for U.S. Appl. No. 12/949,081 dated Jan. 9, 2013, 12 pages.
Final Office Action for U.S. Appl. No. 12/193,377 dated Jan. 17, 2013, 24 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
Esper Reference Documentation, Copyright 2009, ver. 3.1.0, 293 pages.
International Search Report dated Jul. 16, 2012 for PCT/US2012/034970.
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Notice of Allowance for U.S. Appl. No. 12/506,891 dated Jul. 25, 2012.
Final Office Action for U.S. Appl. No. 12/506,905 dated Aug. 9, 2012.
U.S. Appl. No. 12/548,187, Non-Final Office Action mailed on Apr. 9, 2013, 17 pages.
U.S. Appl. No. 12/548,222, Non-Final Office Action mailed on Apr. 10, 2013, 16 pages.
U.S. Appl. No. 12/548,281, Non-Final Office Action mailed on Apr. 12, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
U.S. Appl. No. 13/149,037, Non-Final Office Action mailed on May 1, 2013, 8 pages.
Bajaj et al. Web Services Policy 1.2—Framework (WS-Policy) W3C Member Submission (Apr. 25, 2006), all pages.

* cited by examiner

LOGGING FRAMEWORK FOR A DATA STREAM PROCESSING SERVER

CROSS-REFERENCES TO RELATED APPLICATIONS

The present application incorporates by reference for all purposes the entire contents of the following related application: U.S. patent application Ser. No. 12/534,398, entitled "LOG VISUALIZATION TOOL FOR A DATA STREAM PROCESSING SERVER," filed Aug. 3, 2009, now U.S. Pat. No. 8,386,466, issued on Feb. 26, 2013.

BACKGROUND

The present disclosure relates in general to data logging, and in particular to the logging of data pertaining to the operation of a data stream processing server.

Traditional database management systems (DBMSs) execute queries in a "request-response" fashion over finite, stored data sets. For example, a traditional DBMS can receive a request to execute a query from a client, execute the query against a stored database, and return a result set to the client.

In recent years, data stream management systems (DSMSs) have been developed that can execute queries in a continuous manner over potentially unbounded, real-time data streams. For example, a typical DSMS can receive one or more data streams, register a query against the data streams, and continuously execute the query as new data appears in the streams. Since this type of query (referred to herein as a "continuous query") is long-running, the DSMS can provide a continuous stream of updated results to a client. DSMSs are particularly suited for applications that require real-time or near real-time processing of streaming data, such as financial ticker analysis, physical probe/sensor monitoring, network traffic management, and the like.

Many DSMSs include a server application (referred to herein as a "data stream processing server") that is configured to perform the core tasks of receiving data streams and performing various operations (e.g., executing continuous queries) on the streams. It would be desirable to have a framework for logging data pertaining to the operation of such a data stream processing server to facilitate performance tuning, debugging, and other functions.

BRIEF SUMMARY

Embodiments of the present invention provide techniques for logging data pertaining to the operation of a data stream processing server. In one set of embodiments, logging configuration information can be received specifying a functional area of a data stream processing server to be logged. Based on the logging configuration information, logging can be dynamically enabled for objects associated with the functional area that are instantiated by the data stream processing server, and logging can be dynamically disabled for objects associated with the functional area that are discarded (or no longer used) by the data stream processing server. By dynamically enabling and disabling logging for specific objects in this manner, data regarding the operation of the data stream processing server can be logged without significantly affecting the server's runtime performance. In another set of embodiments, a tool can be provided for visualizing the data logged by the data stream processing server.

According to one embodiment of the present invention, a method for facilitating logging in a data stream processing server is provided. The method comprises receiving, at a computer system, logging configuration information specifying a functional area of a data stream processing server to be logged, and identifying, by the computer system, an object associated with the functional area that has been instantiated by the data stream processing server. The method further comprises enabling, by the computer system, logging for the object, and determining, by the computer system, if the object is no longer used by the data stream processing server. If the object is no longer used, logging is disabled by the computer system for the object.

In one embodiment, enabling logging for the object comprises storing the logging configuration information for the object and generating one or more log records for the object based on the logging configuration information stored for the object.

In one embodiment, disabling logging for the object comprises deleting the logging configuration information stored for the object.

In one embodiment, the logging configuration information includes a first parameter identifying an event upon which to generate a log record and a second parameter identifying a level of detail for the log record. In this embodiment, generating one or more log records for the object comprises, upon occurrence of a predefined event related to the object, retrieving the logging configuration information stored for the object and determining if the predefined event corresponds to the event identified by first parameter. If the predefined event corresponds to the event identified by the first parameter, a log record is generated for the object, where the generated log record has the level of detail identified by the second parameter.

In one embodiment, the functional area to be logged corresponds to a type of query plan object. In this embodiment, identifying an object associated with the functional area comprises traversing a query plan generated for a continuous query, where the query plan includes a plurality of query plan objects, and identifying a query plan object in the plurality of query plan objects having the type. Further, determining if the object is no longer used comprises determining if the continuous query is dropped.

In one embodiment, the plurality of query plan objects include an operator object and one or more data structure objects associated with the operator object. In a further embodiment, if logging is enabled for the operator object, logging is automatically enabled for the one or more data structure objects associated with the operator object.

In one embodiment, the method above further comprises identifying another object associated with the functional area, where the another object was instantiated by the data stream processing server subsequently to receiving the logging configuration information, and enabling logging for the another object.

In one embodiment, the logging configuration information is received from a user and is expressed as a Continuous Query Language (CQL) statement. In another embodiment, the logging configuration information is received via an invocation of a Java Management Extensions (JMX) Applications Programming Interface (API).

According to another embodiment of the present invention, a machine-readable storage medium having stored thereon program code executable by a computer system is provided. The program code includes code that causes the computer system to receive logging configuration information specifying a functional area of a data stream processing server to be logged, and code that causes the computer system to identify an object associated with the functional area that has been instantiated by the data stream processing server. The program code further comprises code that causes the computer system to enable logging for the object, code that causes the computer system to determine if the object is no longer used by the data stream processing server, and code that causes the computer system to, if the object is no longer used, disable logging for the object.

According to another embodiment of the present invention, a logging system is provided. The logging system comprises a processing component configured to receive logging configuration information specifying a functional area of a data stream processing server to be logged and to identify an object associated with the functional area that has been instantiated by the data stream processing server. The processing component is further configured to enable logging for the object and to determine if the object is no longer used by the data stream processing server. If the object is no longer used, the processing component is configured to disable logging for the object.

According to another embodiment of the present invention, a method for visualizing log records is provided. The method comprises receiving, at a computer system, a file comprising log records generated by a data stream processing server, where the log records include information pertaining to a query plan and a sequence of one or more events executed by the data stream processing server in accordance with the query plan. The method further comprises generating, by the computer system, a graphical representation of the query plan based on the log records, and displaying, by the computer system, the graphical representation.

In one embodiment, the graphical representation of the query plan comprises one or more nodes, where each node represents an query plan object in the query plan. Examples of query plan objects include operators, queues, stores, indexes, synopses, etc.

In one embodiment, the method above further comprises, in response to a user input, displaying data information for a node.

In one embodiment, the method above further comprises, in response to a first user input, visually portraying execution of the one or more events in sequence by animating the graphical representation, where visually portraying execution of the one or more events in sequence comprises visually portraying execution of the one or more events in real-time based on timestamps associated with the one or more events. In a further embodiment, the method above further comprises, in response to a second user input, pausing the animation.

In one embodiment, the method above further comprises, if the log records indicate that an error occurred during execution of an event in the one or more events, displaying a representation of the error in the graphical representation.

In one embodiment, the method above further comprises providing the one or more events as one or more data streams to another data stream processing server and receiving a continuous query to be executed against the one or more data streams. The continuous query can then be executed by the another data stream processing server while the graphical representation is being animated.

In one embodiment, the method above further comprises, if a result for the continuous query is received from the another data stream processing server, pausing the animation. In another embodiment, the method above further comprises, if a result for the continuous query is received from the another data stream processing server, displaying an alert.

According to another embodiment of the present invention, a machine-readable storage medium having stored thereon program code executable by a computer system is provided. The program code includes code that causes the computer system to receive a file comprising log records generated by a data stream processing server, where the log records include information pertaining to a query plan and a sequence of events executed by the data stream processing server in accordance with the query plan. The program code further comprises code that causes the computer system to generate a graphical representation of the query plan based on the log records and code that causes the computer system to display the graphical representation.

According to another embodiment of the present invention, a log visualization system is provided. The log visualization system comprises a storage component configured to store a file comprising log records generated by a data stream processing server, where the log records include information pertaining to a query plan and a sequence of events executed by the data stream processing server in accordance with the query plan. The log visualization system further comprises a processing component in communication with the storage component, where the processing component is configured to generate a graphical representation of the query plan based on the log records and display the graphical representation.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention provide techniques for logging data pertaining to the operation of a data stream processing server. In one set of embodiments, logging configuration information can be received specifying a functional area of a data stream processing server to be logged. Based on the logging configuration information, logging can be dynamically enabled for objects associated with the functional area that are instantiated by the data stream processing server, and logging can be dynamically disabled for objects associated with the functional area that are discarded (or no longer used) by the data stream processing server. By dynamically enabling and disabling logging for specific objects in this manner, data regarding the operation of the data stream processing server can be logged without significantly affecting the server's runtime performance.

In certain embodiments, the functional area specified in the logging configuration information can correspond to a type of query plan object, where a query plan object is a component of a query plan, and where a query plan is a data structure used by the data stream processing server to execute a continuous query. Examples of query plan object types include "operator," "queue," "store," "synopsis," "index," and the like. In these embodiments, logging can be dynamically enabled or disabled for query plan objects having the specified type based on query plan changes in the data stream processing server. For instance, in one set of embodiments, logging can be dynamically enabled for query plan objects having the specified type that are instantiated upon generation of a new query plan. In another set of embodiments, logging can be dynamically disabled for query plan objects having the specified type that are discarded upon the deletion of an existing query plan.

In one set of embodiments, a tool can be provided for visualizing log records that are generated for query plan objects according to the techniques noted above. For example, the tool can receive log records containing data regarding one or more events executed by the query plan objects in accordance with a query plan. The tool can then generate a visual representation of the query plan and animate, in real-time, the visual representation to illustrate the execution of the events. Such a tool can be useful for administrators, developers, and other users in understanding and analyzing the log records.

Figure 1A:
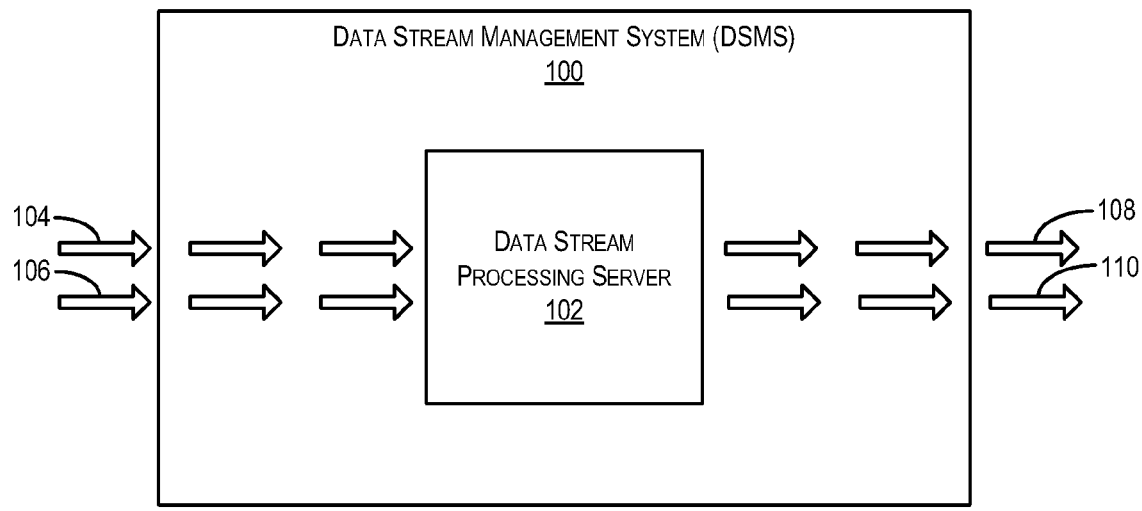
FIGS. 1A and 1B are simplified block diagrams of a data stream management system according to an embodiment of the present invention.

FIG. 1A is a simplified block diagram of a data stream management system (DSMS) 100 according to an embodiment of the present invention. DSMS 100 can be implemented in software, hardware, or a combination thereof. Unlike traditional DBMSs, DSMS 100 can process queries in a continuous manner over potentially unbounded, real-time data streams. To facilitate this processing, DSMS 100 can include a server application (e.g., data stream processing server 102) that is configured to receive one or more input data streams (e.g., streams 104, 106), execute continuous queries against the input data streams, and generate one or more output data streams of results (e.g., streams 108, 110).

In one set of embodiments, server 102 can log data pertaining to its runtime operation. For example, in particular embodiments, server 102 can log data pertaining to query plan objects that are used by the server to execute continuous queries. This logged information can then be used by, e.g., an administrator or other user of server 102 to debug errors or analyze performance problems that may haven arisen during query execution. This logging capability is described in greater detail below.

Figure 1B:
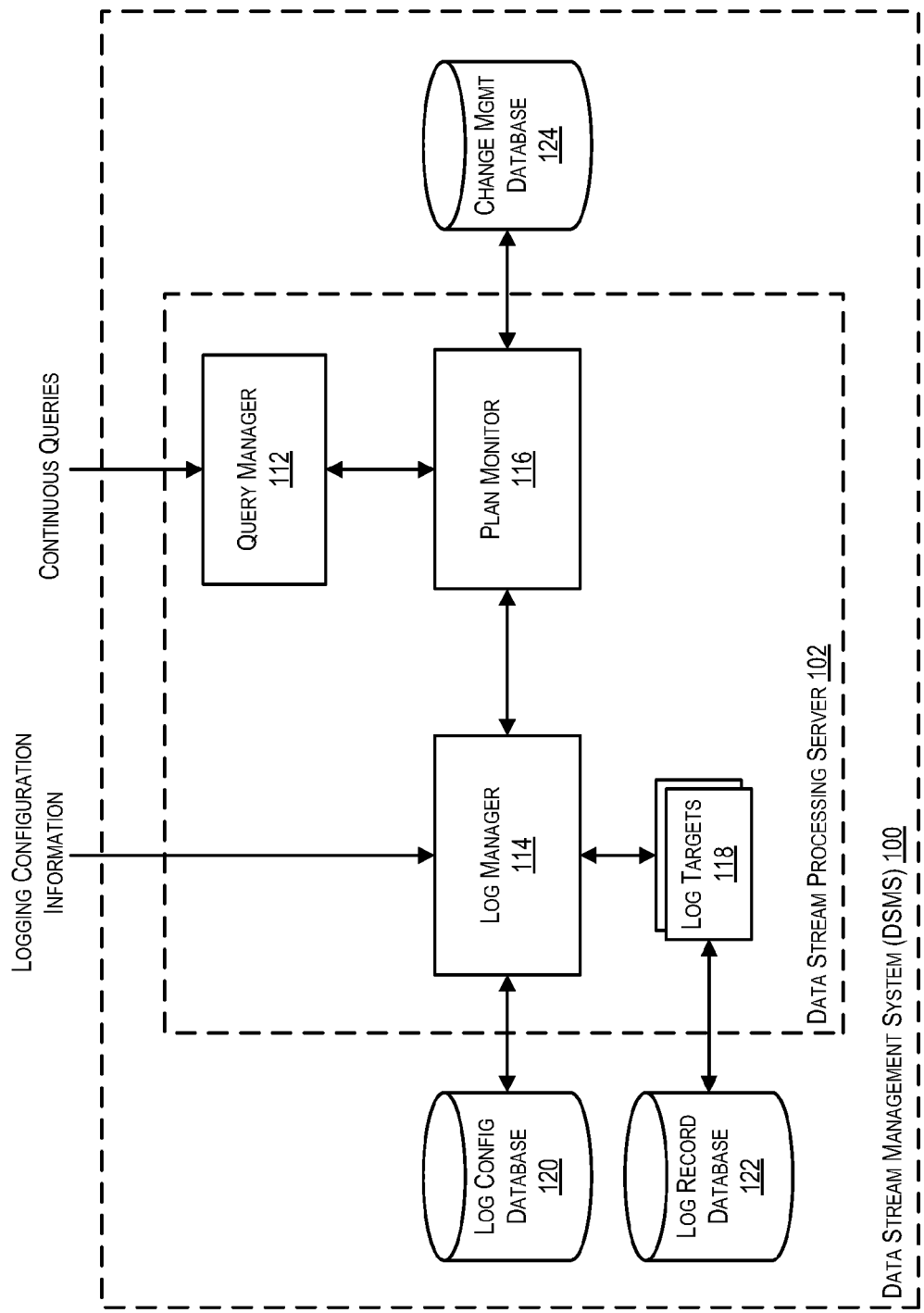

FIG. 1B is a simplified block diagram illustrating a more detailed view of DSMS 100 and data stream processing server 102 according to an embodiment of the present invention. As shown, server 102 can comprise a plurality of software components including a query manager 112, a log manager 114, a plan monitor 116, and log targets 118.

In various embodiments, query manager 112 can receive continuous queries from, e.g., a client application or a user and generate query plans for executing the queries. As described above, a continuous query is a query that can be run in a continuous or persistent fashion against one or more data streams. A query plan is a data structure comprising one or more objects (referred to herein as "query plan objects") that can be used by server 102 to execute a continuous query. In some embodiments, query manager 112 can generate a separate query plan for each received query. In other embodiments, query manager 112 can maintain a single, global query plan for multiple queries.

Figure 2:
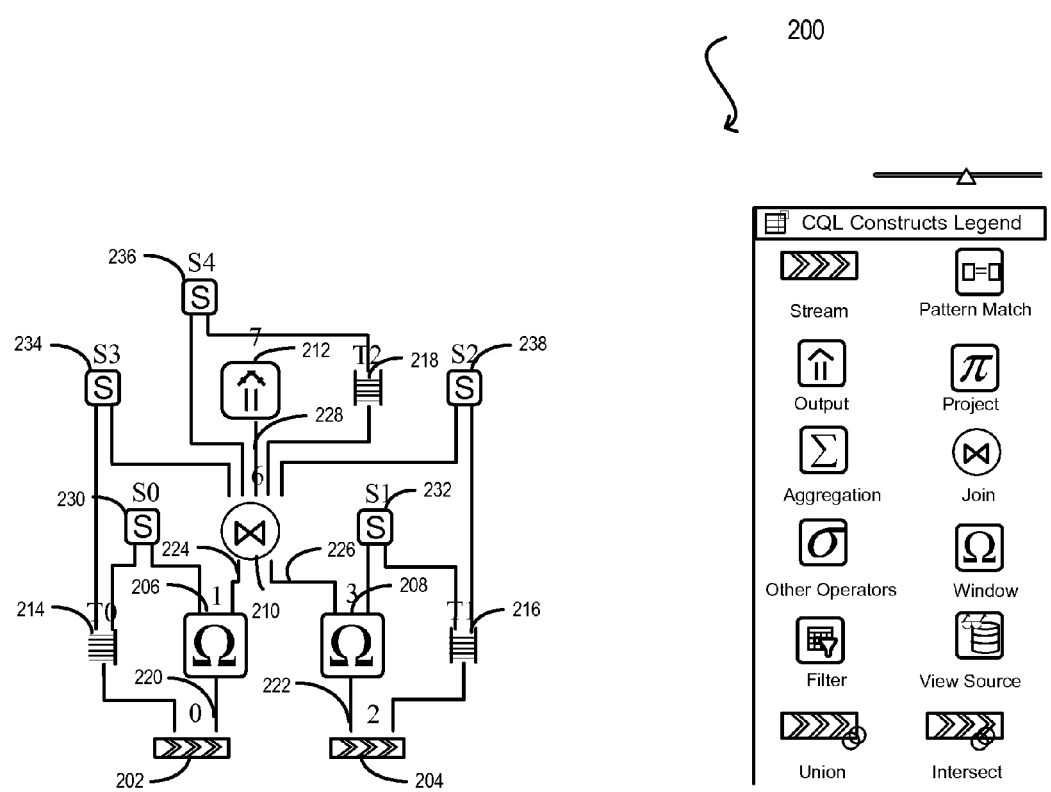
FIG. 2 is a graphical representation of a query plan according to an embodiment of the present invention.

By way of example, FIG. 2 is a graphical representation of a query plan 200 that can be generated by query manager 112 for a continuous query. As shown, query plan 200 can include a plurality of query plan objects 202-238 arranged in a hierarchical fashion. In certain embodiments, each query plan object can correspond to a software object (e.g., a JAVA a C++ object) that can be invoked to perform one or more actions. When input data (e.g., input data streams 104, 106 of FIG. 1A) is passed through plan 200 and query plan objects 202-238 are invoked in the specified order, the continuous query associated with plan 200 can be executed.

In one set of embodiments, each query plan object can have a particular type that indicates its functional role within the plan. For example, query plan objects 202-212 are "operator" objects that are configured to carry out specific operations, or steps, in the overall execution of the continuous query. Query plan 200 can also include various other types of query plan objects such as "store" objects 214-218, "queue" objects 220-228, and "synopsis" objects 230-238. Generally speaking, store, queue, and synopsis objects are data structure objects that can be associated with one or more operator objects and can be used to maintain an operator object's state and/or manage data flow into (or out of) an operator object. For instance, in the embodiment of FIG. 2, operator object 210 can be associated with a store object 218, queue objects 224-228, and synopsis objects 234-238.

Once a query plan (such as plan 200) has been generated for a continuous query, query manager 112 (or another component of server 102) can execute the continuous query using the query plan. For example, with respect to query plan 200, query manager 112 can invoke the various query plan objects 202-238 according to the hierarchical ordering of plan 200 and thereby execute the associated query.

Returning to FIG. 1B, log manager 114 can facilitate the logging of various functional areas of server 102. In one set of embodiments, log manager 114 can receive logging configuration information specifying a particular functional area of server 102. This information can be received, for example, from a user via a user interface or from a client application via an invocation of an Application Programming Interface (API). Upon receiving the logging configuration information, log manager 114 can store (in, e.g., log configuration database 120) a copy of the logging configuration information for one or more software objects associated with the specified area that have been instantiated by server 102. This stored information can then be accessed by log manager 114 at runtime of server 102 to generate log records for each object.

For example, at runtime of server 102, the various software objects used by the server (e.g., log targets 118) can invoke log manager 114 upon the occurrence of certain predefined events. In response, log manager 114 can determine, based on the logging configuration information stored in log configuration database 120, whether logging has been enabled for those log targets. If log manager 114 determines that logging has been enabled for a particular log target 118, log manager 114 can instruct the log target to generate a log record and store the record in log record database 122.

In some embodiments, the functional area specified in the logging configuration information received by log manager 114 can correspond to a type of query plan object, such as "operator," "queue" "store," "synopsis," and so on. In these embodiments, log manager 114 can interoperate with plan monitor 116 to identify query plan objects that have been instantiated by query manager 112 (via, e.g., the generation of query plans). Specifically, log manager can send the logging configuration information to plan monitor 116, which is configured to traverse the query plans generated by query manager 112 and identify query plan objects having the specified type. Plan monitor can then return IDs for the identified query plan objects to log manager 114, which can store the IDs with the logging configuration information in log configuration database 120. In this manner, logging can be enabled for these specific query plan objects.

At runtime of server 102, the query plan objects used by the server (e.g., for executing continuous queries) can invoke log manager 114 upon the occurrence of certain predefined events. In response, log manager 114 can determine, based on the logging configuration information stored in log configuration database 102, whether logging has been enabled for those query plan objects. If logging has been enabled for a particular query plan object, logging manager 114 can instruct the query plan object to generate a log record and store the record in log record database 122.

In one set of embodiments, plan monitor 116 can, upon receipt of the logging configuration information from log manager 114, keep track of "change management information" in change management database 124. As used herein, "change management information" refers to changes that should be made to the information stored in log configuration database 120 in the event that new query plan objects are instantiated (e.g., via the generation of new query plans) or existing query plan objects are discarded or rendered obsolete (e.g., via the deletion of existing query plans) by query manager 112.

For example, assume the logging configuration information specifies that logging should be enabled for all operator-type query plan objects, and assume that there are currently two operator objects (having IDs O1 and O2) instantiated in the server. In this case, the change management information can specify that the logging configuration information should be added to log configuration database 120 for any new operator objects subsequently instantiated by query manager 112. Further, the change management information can specify that the logging configuration information stored in log configuration database 120 for operator objects O1 and O2 should be deleted if either of these objects are discarded or rendered obsolete by query manager 112.

Once the change management information described above has been stored in change management database 124, plan monitor 116 can be automatically updated of any query plan changes by query manager 112. For example, query manager 112 can notify plan monitor 116 when a new query plan is generated, or when an existing query plan is discarded. Plan monitor 116 can then determine, based on the change management information stored in change management database 124, if any changes need to be applied to log configuration database 120. If changes need to be made (e.g., logging configuration information needs to be added or deleted for a specific query plan object), plan monitor 116 can instruct log manager 114 to apply those changes. In this manner, logging can be dynamically enabled and disabled for query plan objects in response to query plan changes.

It should be appreciated that FIGS. 1A and 1B are illustrative and not intended to limit embodiments of the present invention. For example, DSMS 100 and server 102 may each have other capabilities or include other components that are not specifically described. One of ordinary skill in the art will recognize many variations, modifications, and alternatives.

Figure 3:
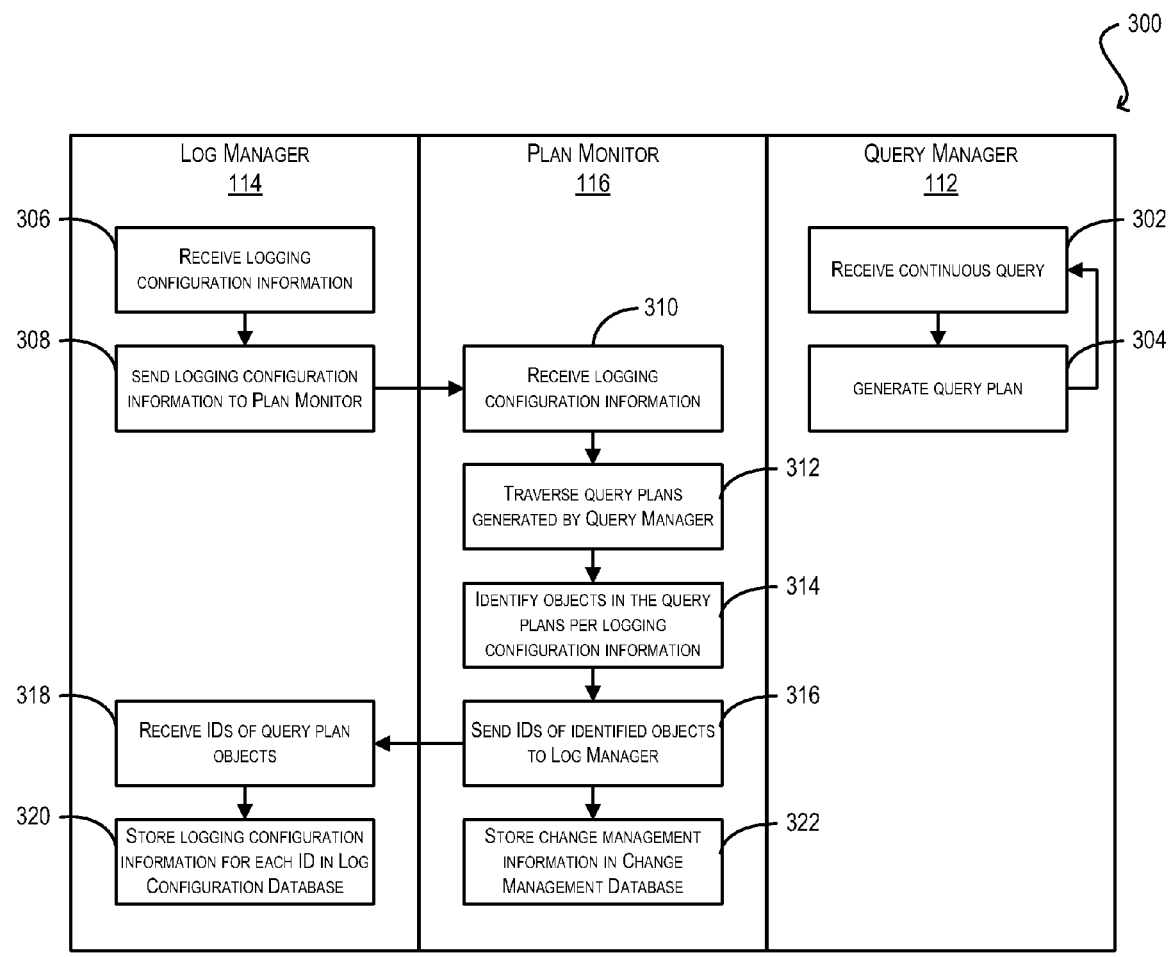
FIG. 3 is a flow diagram of a process for configuring logging in a data stream processing server according to an embodiment of the present invention.

FIG. 3 is a flow diagram of a process 300 for configuring logging in a data stream processing server according to an embodiment of the present invention. In one set of embodiments, process 300 can be carried out by log manager 114, plan monitor 116, and query manager 112 of FIG. 1B to enable logging of query plan objects used by server 102. Process 300 can be implemented in hardware, software, or a combination thereof. As software, process 300 can be encoded as program code stored on a machine-readable storage medium.

At blocks 302 and 304, query manager 112 can receive a continuous query and generate a query plan for the query. As described above, a query plan is a data structure comprising one or more objects (query plan objects) that can be used (by, e.g., server 102) to execute a continuous query. In certain embodiments, the processing of steps 302 and 304 can be repeated continuously as new queries are received.

Concurrently with blocks 302 and 304, log manager 114 can receive logging configuration information specifying a type of query plan object to be logged (block 306). In one set of embodiments, the logging configuration information can be received from a user of server 102 via, e.g., a user interface. In these embodiments, the logging configuration information can be expressed as a Continuous Query Language (CQL) statement. In other embodiments, the logging configuration information can be received from a client application or some other automated process via, e.g., an invocation of an Application Programming Interface (API) such as a Java Management Extensions (JMX) API.

In one set of embodiments, the logging configuration information received at block 306 can include at least three parameters: <AREA>, <EVENT>, and <LEVEL>, The <AREA> parameter can specify an identifier (ID) of a particular functional area of server 102 to be logged. For example, in the context of query plan objects, the <AREA> parameter can specify an ID of particular query plan object type to be logged, such as "operator," "store," "queue," "synopsis," and the like. In some embodiments, the <AREA> parameter can also specify an ID of a "subtype," where the subtype represents another level of granularity within the specified area. For example, if the specified area is "operator," the <AREA> parameter can also include a subtype of "binjoin," "timewindow," or other subtypes of operator objects.

The <EVENT> parameter can specify an ID of an event, or operation, upon which logging should occur. In other words, the <EVENT> parameter can indicate when a log record should be generated for the specified area. In one set of embodiments, the permissible ID values for the <EVENT> parameter can vary based on the area specified via the <AREA> parameter. For example, if the specified area is "operator" (denoting the "operator" query plan object type), the permissible ID values for <EVENT> may be limited to those events that are typically carried out by operator objects, such as "begin execution" and "end execution." As another example, if the specified area is "queue" (denoting the "queue" query plan object type), the permissible ID values for <EVENT> may be limited to those events that are typically carried out by queue objects, such as "enqueue" and "dequeue."

The <LEVEL> parameter can specify an ID indicating the desired level of detail, or verbosity, of the generated log record. Like the <EVENT> parameter, the permissible ID values for the <LEVEL> parameter can vary based on the area specified via the <AREA> parameter. Further, the meaning of a particular level ID may be different based on the specified area. For example, a level ID of "1" may denote a certain level of detail for the "queue" object type and a different level of detail for the "operator" object type.

In some embodiments, if the area specified via the <AREA> corresponds to the operator object type, certain ID values for the <LEVEL> parameter can cause the generated log record to include information about data structure objects (e.g., stores, queues, synopses, etc.) associated with the operator object. In this manner, logging can be enabled for a plurality of related query plan objects via a single configuration command.

The following is a table of ID values for the <AREA>, <EVENT>, and <LEVEL> parameters that can be recognized by log manager 114 according to an embodiment of the present invention:

| AREA ID | EVENT ID and DESCRIPTION | LEVEL ID and DESCRIPTION |
|---|---|---|
| CEP_QUEUE | 21 - Queue DDL<br>22 - Enqueue<br>23 - Dequeue<br>24 - Peek<br>25 - Get | 1 - Metadata information such as number of readers for a writer queue, the operators involved, etc. The exact information to be logged depends on the type of the queue.<br>2 - Timestamp, element kind and tuple details (only if pinned).<br>3 - Timestamp, element kind and tuple details (even if unpinned).<br>4 - Queue stats<br>5 - List of all elements in the queue. The exact information to be logged depends on the type of the queue. |
| CEP_STORE | 41 - Store DDL<br>42 - Insert<br>43 - Delete<br>44 - Get<br>45 - Scan Start<br>46 - Scan<br>47 - Scan Stop | 1 - Metadata information like number of readers/stubs, the operators invoked, etc. The exact information to be logged depends on the type of store.<br>4 - Store statistics<br>5 - List of all tuples/timestamps. The exact information to be logged depends on the type of store. |
| CEP_INDEX | 61 - Index DDL<br>62 - Insert<br>63 - Delete<br>64 - Scan Start<br>65 - Scan<br>66 - Scan Stop | 1 - Tuple information (only if pinned)<br>2 - Tuple information (even if unpinned)<br>3 - Index statistics<br>4 - List of all tuples |
| CEP_SYNOPSIS | 81 - Synopsis DDL<br>82 - Insert<br>83 - Delete<br>84 - Get<br>85 - Scan Start<br>86 - Scan<br>87 - Scan Stop | 1 - Metadata information like the store identifier, stub identifier, number of scans, predicates/undexes, etc (for a relational synopsis).<br>2 - Tuple information (only if pinned)<br>3 - Tuple information (even if unpinned)<br>4 - Store statistics<br>5 - List of all tuples/timestamps<br>6 - Underlying index information<br>7 - List of all tuples |
| CEP_OPERATOR | 101 - Operator DDL<br>102 - Beginning of operator execution<br>103 - End of operator execution<br>104 - Underlying structures (synopsis, queues, indexes, etc.) - equivalent of CEP_QUEUE, CEP_INDEX and CEP_SYNOPSIS at insert/delete<br>105 - Enqueue/dequeue performed during the execution<br>106 - Peeks in the input queues performed during execution<br>107 - Inserts/deletes performed on the synopsis<br>108 - Underlying synopsis scan | 1 - Operator metadata<br>2 - Operator statistics<br>3 - Underlying structure statistics (e.g., input/output queues, store, synopsis)<br>4 - Underlying structures - least detail (equivalent of CEP_QUEUE, CEP_INDEX, and CEP_SYNOPSIS at level that dumps tuples at insert/delete, only if pinned)<br>5 - Underlying structures - more detail (equivalent of level ID 4 plus dump stats and scan)<br>6 - Underlying structures - most detail (equivalent of level ID 5 |

| AREA ID | EVENT ID and DESCRIPTION | LEVEL ID and DESCRIPTION |
|---|---|---|
| | 109 - Underlying index scan | plus dump the complete list at every get in the form of a get, etc.) |
| | | 7 - Detailed operator dump (this may be operator specific. For example, binjoin may decide to dump more information than streamsource). |
| | | 8 - Extremely detailed operator dump; effectively a code walkthrough. |
| CEP_QUERY_OPERATORS | 1 - Log all the operators for a specific query | The level will produce the same amount of logging as the logging for all the operators under consideration. All of the operators of the query can be logged. If IDs are not specified, all queries can be used. |
| CEP_SPILL | 121 - Garbage collection in spilling | 1 - Eviction information |
| | 122 - Eviction Begin | 2 - Spilling statistics |
| | 123 - Eviction End | 3 - Spilling reference map |
| CEP_STORAGE | 141 - DB Open | 1 - DB information |
| | 142 - DB Close | 2 - DB Statistics |
| | 143 - DB Read | |
| | 144 - DB Write | |
| | 145 - DB Delete | |
| | 146 - DB Transaction Begin | |
| | 147 - DB Transaction End | |
| | 148 - DB Query Begin | |
| | 149 - DB Query End | |
| CEP_QUERY | 161 - Creation of query | 1 - Query creation text and corresponding activities (e.g., create, update, drop) |
| | 162 - Modification of query | |
| | 163 - Deletion of query | |
| | 164 - Start of query | 2 - Internal query metadata like Query ID, external destinations, destination views, reference functions, and reference views along with query text. |
| | 165 - End of query | |
| | | 3 - Reference count, whether read or write locked, stack trace |
| CEP_TABLE | 181 - Table creation | 1 - Table creation text and corresponding activities (creation, update, deletion) |
| | 182 - Table update | |
| | 183 - Table deletion | |
| | | 2 - Table ID, referenced queries, whether table is silent, push source (or not), table creation text |
| | | 3 - Reference count, whether read or write locked |
| CEP_WINDOW | 201 - Window creation | 1 - Window creation/deletion activity and context |
| | 202 - Window deletion | |
| | | 2 - Implementation class name, destination queries along with window name |
| | | 3 - Reference count, whether read or write locked |
| CEP_USERFUNCTION | 221 - User function creation | 1 - User function creation text, implementation class name |
| | 222 - User function deletion | |
| | | 2 - Function ID, destination queries, creation text |
| | | 3 - Reference count, whether read or write locked |
| CEP_VIEW | 241 - Creation of view | 1 - Associated query information and view creation or deletion |
| | 242 - Deletion of view | |
| | | 2 - View ID, query ID, destination queries, query information |
| | | 3 - Reference count, whether read or write locked |
| CEP_SYSTEM | 261 - System state creation | 1 - System state, creation/updation/deletion |
| | 262 - System state deletion | |
| | 263 - System state updation | 2 - Reference count, whether read or write locked |

| AREA ID | EVENT ID and DESCRIPTION | LEVEL ID and DESCRIPTION |
|---|---|---|
| CEP_SYSTEM_STATE | N/A | 1 - List of queries<br>2 - List of tables<br>3 - List of windows<br>4 - List of user functions<br>5 - List of views |

Once the logging configuration information is received per block 306, log manager 114 can determine, based on the <AREA> parameter in the received information, the functional area to be logged. For the purposes of process 300, it is assumed that the functional area corresponds to a type of query plan object, such as operator, queue, or the like. Log manager 114 can then send the logging configuration information to plan monitor 116 (block 308).

At block 310, plan monitor 116 can receive the logging configuration information and determine the query plan object type specified therein. Plan monitor can then traverse the query plans generated by query manager 112 and identify query plan objects in the query plans that have the specified type (blocks 314, 316). For example, if the logging configuration information specifies the "operator" object type, plan monitor 116 can identify all of the operator objects that have been instantiated by query manager 112 and are included one or more query plans.

Once plan monitor 116 has identified query plan objects per block 314, plan monitor 116 can return a list of IDs for the identified query plan objects to log manager 114 (blocks 316, 318). Log manager 114 can then store the object IDs along with the logging configuration information received at block 306 in a data store, such as log configuration database 120 of FIG. 1B (block 320). At runtime of server 102, this stored information can be used to generate log records for the identified query plan objects. This runtime process is discussed in greater detail with respect to FIG. 5 below.

In one set of embodiments, plan monitor can also store change management information in change management database 124 at block 322. As described above, this change management information can represent changes that should be made to the logging configuration information stored in log configuration database 120 (per block 320) in the event that new query plan objects are instantiated (e.g., via the generation of new query plans) or existing query plan objects are discarded or rendered obsolete (e.g., via the deletion of existing query plans) by query manager 112. Accordingly, this change management information can be used to dynamically enable or disable logging for query plan objects as query plan changes occur.

For instance, in one set of embodiments, plan monitor 116 can be automatically notified by query manager 112 when, e.g., a new query plan is generated, or when an existing query plan is discarded. Plan monitor 116 can then determine, based on the information stored in change management database 124, if any changes need to be made to the logging configuration information stored in log configuration database 120 to enable or disable logging for a particular query plan object. If a change need to be made (e.g., logging configuration information needs to be added or deleted for a specific object), plan monitor 116 can instruct log manager 114 to apply the change. This process is described in greater detail with respect to FIG. 7 below.

It will be appreciated that process 300 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 4:
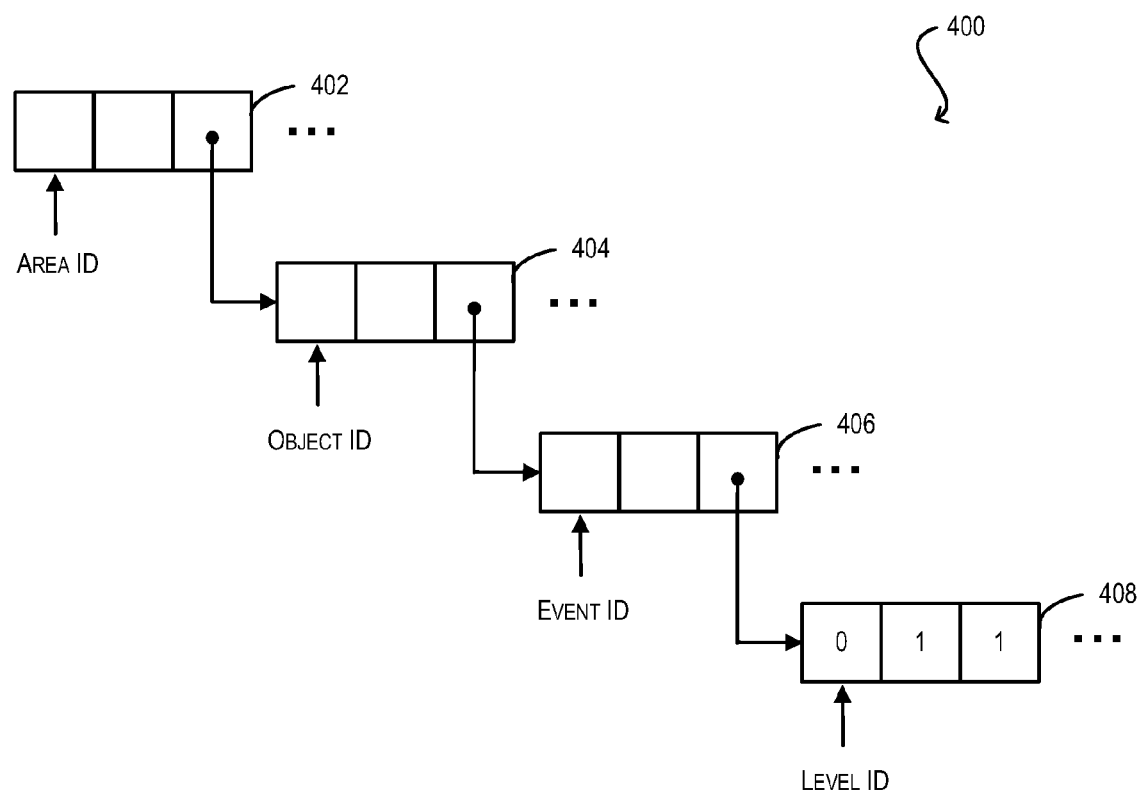
FIG. 4 is a simplified diagram of a data structure for storing logging configuration information according to an embodiment of the present invention.

In some embodiments, the logging configuration information stored at block 320 of process 300 can be stored in a particular type of data structure, such as a multi-dimensional array. An example of such a multi-dimensional array 400 is illustrated in FIG. 4. As shown, multi-dimensional array 400 can include a first array 402 that is indexed by area ID. Each area ID index can correspond to a functional area that can be logged in server 102. In one set of embodiments, array 402 can include indices for various query plan object types such as operator, queue, store, synopsis, and so on.

Each value in array 402 can be a pointer to a second array 404 that is indexed by object ID. Each object ID index can correspond to a particular object instance (associated with the selected area) that can be logged by server 102.

Each value in array 404 can be a pointer to a third array 406 that is indexed by event ID. Each event ID index can correspond to a particular event that can be logged for the selected area and object.

Finally, each value in array 406 can be a pointer to a fourth array 408 that is indexed by level ID. Each level ID index can correspond to a particular level of detail for generating a log record for the selected area, object, and event. In one set of embodiments, the values in array 408 can be a binary values indicating whether logging is enabled or disabled for that particular combination of [area, object, event, level]. In alternative embodiments, the values in array 408 can be booleans, strings, or any other type of value that can indicate whether logging is enabled or disabled.

Figure 5:
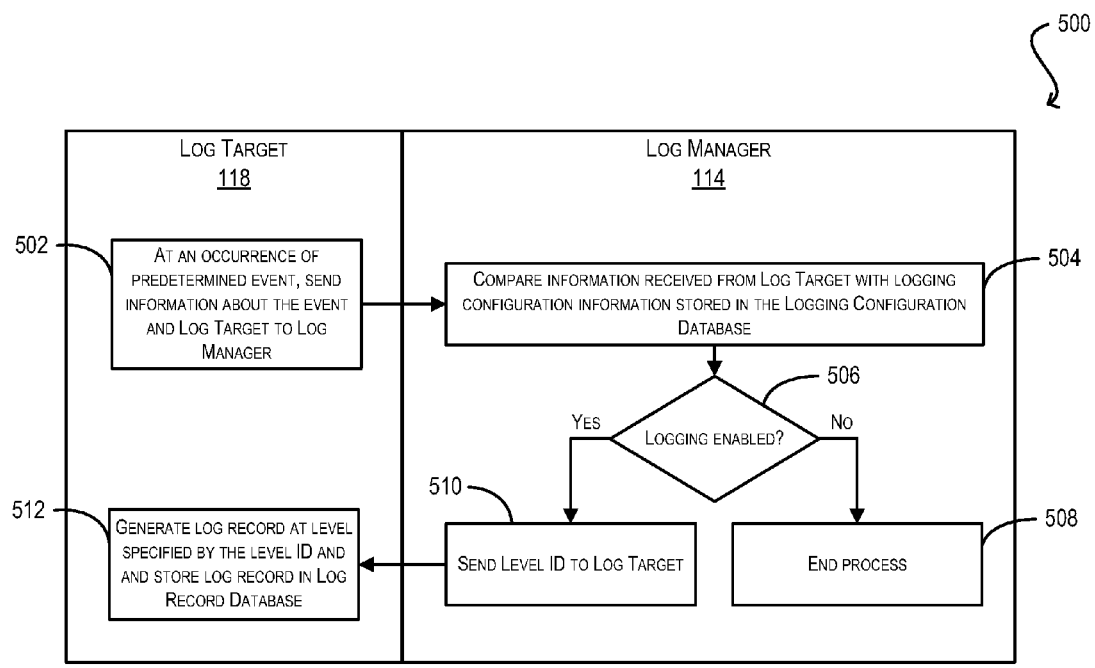
FIG. 5 is a flow diagram of a process for generating log records in a data stream processing server according to an embodiment of the present invention.

FIG. 5 is a flow diagram of a process 500 for generating log records at runtime of server 102 according to an embodiment of the present invention. In one set of embodiments, process 500 can be carried out by log manager 114 and an object being used by server 102 (i.e., log target 118) after configuration process 300 has been performed. In certain embodiments, log target 118 can correspond to a query plan object being used by server 102 to execute a continuous query. Process 500 can be implemented in hardware, software, or a combination thereof. As software, process 500 can be encoded as program code stored on a machine-readable storage medium.

At block 502, log target 118 can invoke log manager 114 upon occurrence of a predetermined event and provide log manager 114 with information pertaining to the event and itself. In various embodiments, log target 118 can be preconfigured with code for invoking log manager 114 in this manner.

In some embodiments, the "predetermined event" that triggers invocation of log manager 114 can be different based on the object type of log target 118. For example, if log target 118 is an operator object, log target 118 can be preconfigured to invoke log manager 114 upon, e.g., the occurrence of "begin execution" and "end execution" events. As another example, if log target 118 is a queue object, log target 118 can be preconfigured to invoke log manager 114 upon, e.g., the occurrence of "enqueue" and "dequeue" events.

At block 504, log manager 114 can determine, from the information received from log target 118, the area ID and object ID for log target 118, as well as the event ID for the event that occurred at block 502. The area ID, object ID, and event ID can then be compared with the logging configuration information stored in log configuration database 120 to determine whether logging has been enabled for that particular combination of [area ID, object ID, event ID] (block 506). For example, if the logging configuration information is stored in the form of multi-dimensional array 400 of FIG. 4, this process can comprise accessing array 402 using the determined area ID, accessing array 404 using the determined object ID, accessing array 406 using the determined event ID, and retrieving the appropriate array 408. In this embodiment, array 408 can identify all of the levels for which logging is enabled.

If logging is not enabled for any levels corresponding to the [area ID, object ID, event ID] determined at block 504, process 500 can end (blocks 506, 508). On the other hand, if logging is enabled for one or more levels, log manager 114 can send the IDs for those levels to log target 118 (block 510). In response, log target 118 can generate a log record based on the specified levels and store the log record in log record database 122 (block 512).

It will be appreciated that process 500 is illustrative and not intended to limit embodiments of the present invention. Steps described as sequential may be executed in parallel, order of steps may be varied, and steps may be modified, combined, added, or omitted. One of ordinary skill in the art would recognize many variations, modifications, and alternatives.

Figure 6:
FIG. 6 illustrates a log record according to an embodiment of the present invention.

FIG. 6 illustrates a example log record 600 that may be generated per block 512 of process 500 according to an embodiment of the present invention. In this particular example, log record 600 was generated upon the occurrence of an "enqueue" event related to a queue object. Accordingly, log record 600 specifies an event ID (i.e., event name) of "QUEUE_ENQUEUE" and a queue object ID of "11." Log record 600 further includes data that has been logged a plurality of different levels (level IDs 0-6). As can be seen, the data logged at each level differs in type and detail. For example, the data logged at level ID 0 (the most detailed level) includes a stack trace of an exception that occurred during the enqueue event. The data logged at other level IDs contain various other details about the enqueue event.

Although not shown in FIG. 6, in some embodiments log record 600 can also include a timestamp indicating a time at which the log record was generated or stored. Further, log record 600 can include details about the query plan associated with this particular queue object. In various embodiments, this logged information can be used to visualize the execution of events in the query plan. This visualization technique is discussed in greater detail with respect to FIGS. 8, 9, and 10 below.

It will be appreciated that log record 600 is illustrative and not intended to limit embodiments of the present invention. For example, although log record 600 is shown as being expressed according to a particular structure and using particular naming conventions, log record 600 can also be expressed in many different ways. One of ordinary skill in the art would recognize many variations, modifications, and alternatives.

Figure 7:
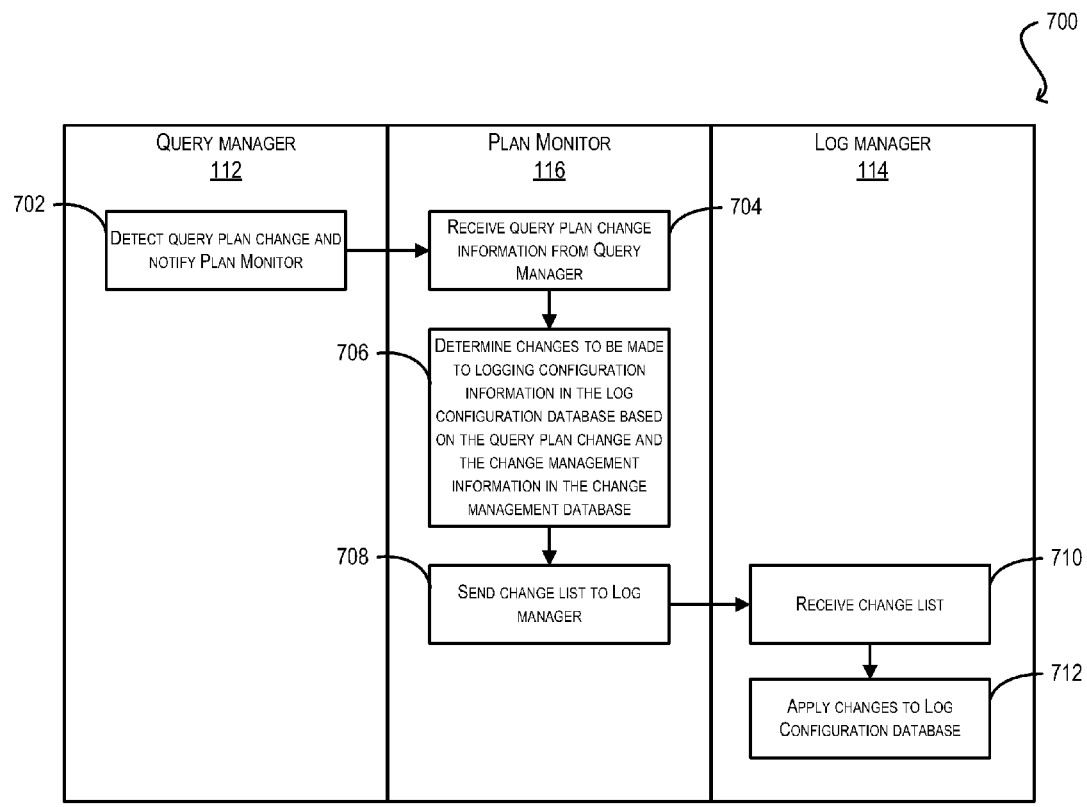
FIG. 7 is a flow diagram of a process for dynamically enabling or disabling logging of query plan objects according to an embodiment of the present invention.

As described above, in certain embodiments logging can be dynamically enabled or disabled for query plan objects based on query plan changes in server 102. FIG. 7 is a flow diagram illustrating such a process 700 according to an embodiment of the present invention. In one set of embodiments, process 700 can be carried out by query manager 112, plan monitor 116, and log manager 114 out after configuration process 300 has been performed. Process 700 can be implemented in hardware, software, or a combination thereof. As software, process 700 can be encoded as program code stored on a machine-readable storage medium.

At block 702, query manager 112 can detect a change that affects one or more query plans used by server 102. For example, query manager 112 can detect when a new query plan has been generated in response to a request to add a new continuous query. Alternatively, query manager 112 can detect when an existing query plan is discarded or obsoleted in response to a request to drop an existing continuous query. Upon detecting a query plan change, query manager 112 can send information regarding the change to plan monitor 116. For example, this query plan change information can include IDs of new query plan objects that have been instantiated (if, e.g., a query has been added), or IDs of query plan objects that have been discarded (if., e.g., an existing query has been dropped).

At block 704, plan monitor 116 can receive the query plan change information from query manager 112. Plan monitor 116 can then determine, based on the change management information stored in change management database 124, if any changes need to be made to the logging configuration information stored in log configuration database 120 (block 706).

For example, assume the change management information specifies that the logging configuration information stored in log configuration database 120 for two objects, O1 and O2, should be deleted if either of these objects are discarded or rendered obsolete by query manager 112. Further, assume that the query plan change information received at block 704 indicates that objects O1 and O2 have, in fact, been discarded. In this case, plan monitor can create a change list specifying deletion of the logging configuration information for these specific objects. In other situations, plan monitor can determine that logging configuration information should be added for certain objects to log configuration database 120, and can create a change list specifying the addition of such information accordingly.

If a change need to be made (e.g., logging configuration information needs to be added or deleted for a specific query plan object), plan monitor 116 can send a change list to log manager 114 (blocks 708, 710). Log manager 114 can then apply the changes to log configuration database 120 (block 712). Alternatively, plan monitor 116 can directly apply the changes to log configuration database 120. By modifying the stored logging configuration information in this manner, logging can be dynamically enabled or disabled for query plan objects as query plan changes occur.

It will be appreciated that process 700 is illustrative and not intended to limit embodiments of the present invention. Steps described as sequential may be executed in parallel, order of steps may be varied, and steps may be modified, combined, added, or omitted. One of ordinary skill in the art would recognize many variations, modifications, and alternatives.

In some situations, the logging techniques described above can create a voluminous amount of log data pertaining to the operation of server 102 that can be difficult to interpret and/or analyze. Accordingly, embodiments of the present invention can provide techniques for visualizing log records created by server 102. In certain embodiments, these visualization techniques allow an end user to graphical view a query plan that has been executed by server 102 and see the progression of operations/events that are performed by query plan objects within the query plan.

Figure 8:
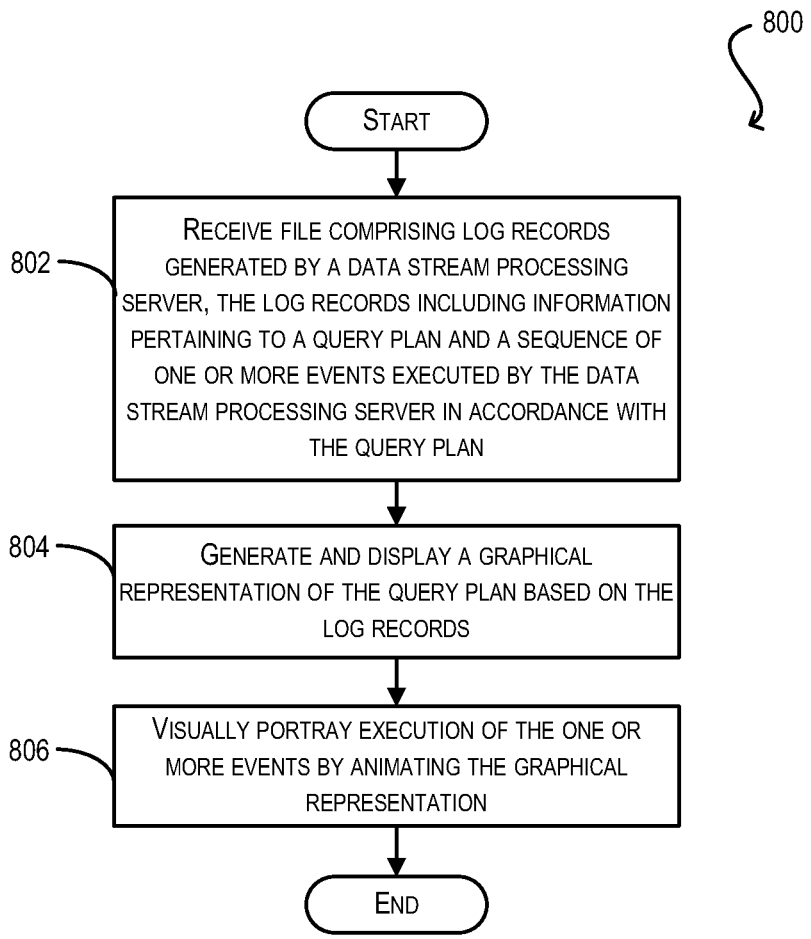
FIG. 8 is a flow diagram of a process for visualizing log records according to an embodiment of the present invention.

FIG. 8 is a flow diagram of a process 800 for visualizing log records according to an embodiment of the present invention. In one set of embodiments, process 800 can be carried out by a software application (e.g., Web-based application proprietary desktop client application, etc.) that is specifically adapted to visualize log records generated by a data stream processing server such as server 102 of FIG. 1B. As software, process 800 can be encoded as program code stored on a machine-readable storage medium.

At block 802, a file can be received comprising log records generated by a data stream processing server, where the log records contain information pertaining to a query plan and a sequence of events executed by the server in accordance with the query plan. For example, the file can contain log records generated according to process 500 of FIG. 5.

At block 804, a graphical representation of the query plan can be generated based on the log records and can be displayed to an end user. In one set of embodiments, the graphical representation can resemble a tree comprising a plurality of nodes, where each node corresponds to an object (e.g., operator, queue, store, etc.) in the query plan (such as the representation of plan 200 depicted in FIG. 2).

At block 806, the graphical representation of the query plan can be animated, thereby depicting the occurrence of logged events over the course of the query's execution. For example, if the log records received at block 802 include an enqueue event and a subsequent dequeue event for a particular queue object, the occurrence of these events can be depicted and animated accordingly. In some embodiments, this animation can occur in real-time based on timestamps associated with the events in the log records. Thus, a user can understand and analyze, in a visual manner, the flow of events and data during query execution.

In certain embodiments, the animation described at block 806 can be initiated, stopped, paused, rewound, and/or fast-forwarded according to inputs received from a user. Further, if the animation is paused, the user can inspect data related each query plan object in the query plan. For example, in one embodiment the user can select a particular query plan object and view information about its state, its associated data structures, etc. at that point in the query execution.

In further embodiments, various alerts and or messages can be displayed to the user during the animation. For example, if the log records contain information about an error (such as the stack trace depicted in log record 600 of FIG. 6), an alert can be generated and displayed advising of that error.

It will be appreciated that process 800 is illustrative and not intended to limit embodiments of the present invention. Steps described as sequential may be executed in parallel, order of steps may be varied, and steps may be modified, combined, added, or omitted. One of ordinary skill in the art would recognize many variations, modifications, and alternatives.

Figure 9:
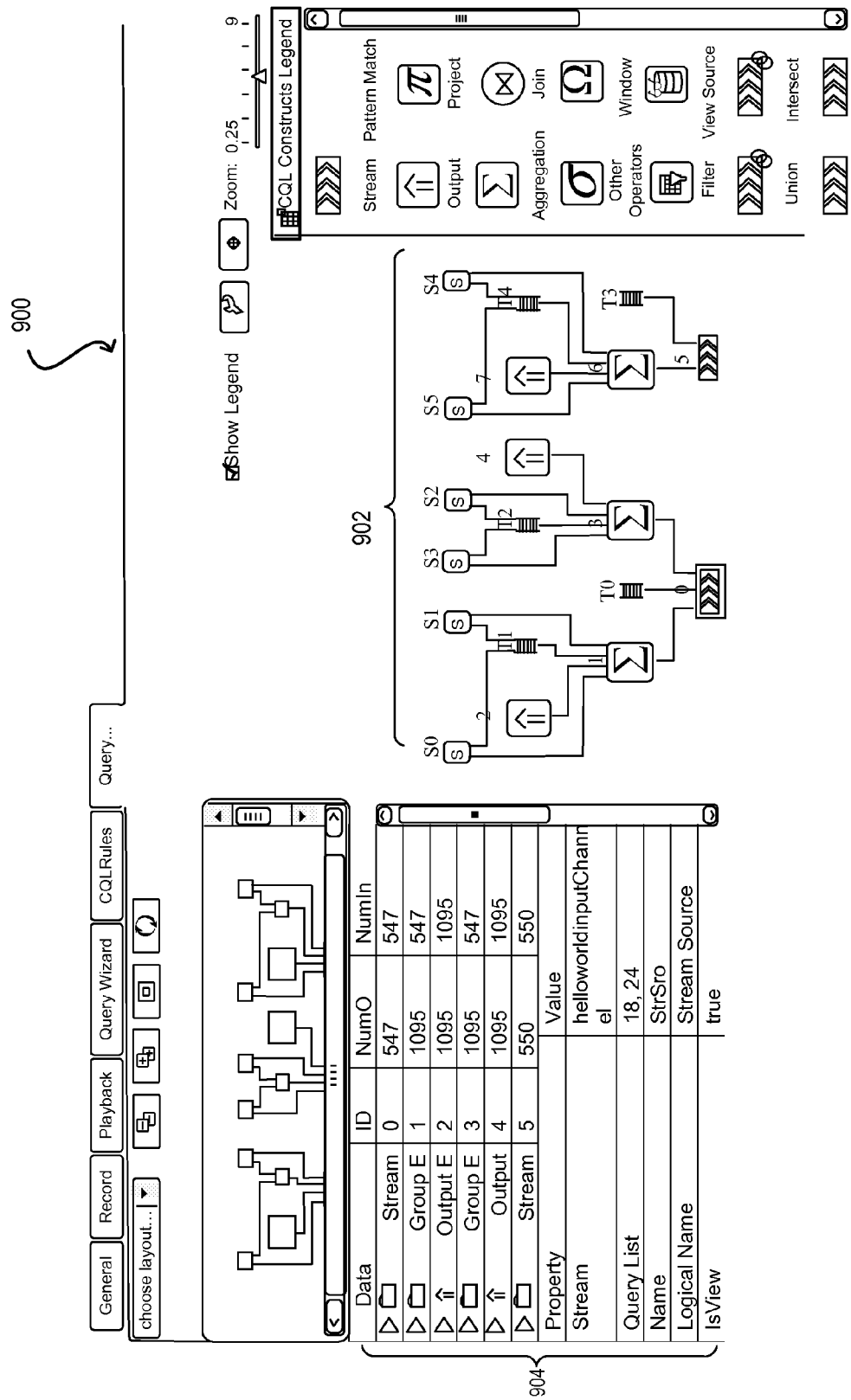
FIG. 9 is a screen display of a log visualization user interface according to an embodiment of the present invention.

FIG. 9 is a screen display 900 of a visualization application configured to carry out the steps of process 800. As shown, screen display 900 includes window 902 displaying a graphical representation of one or more query plans. Screen display 900 also includes a "plan component details" section 904 for displaying details about a particular query plan object.

Figure 10:
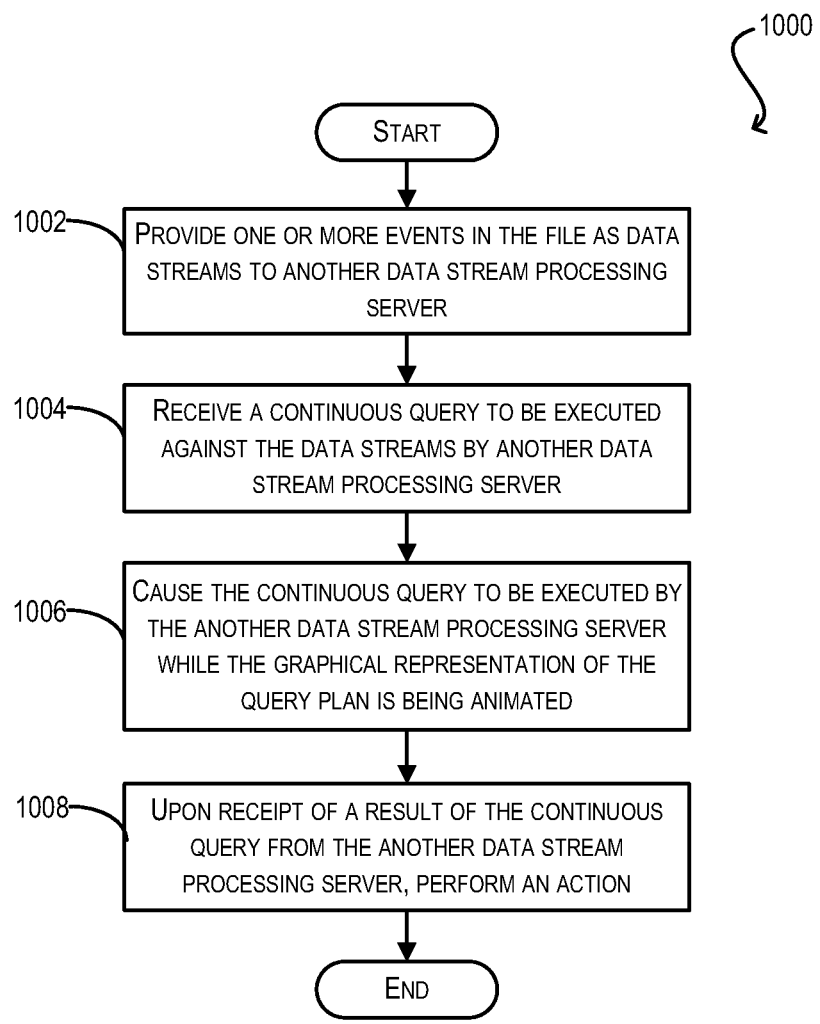
FIG. 10 is flow diagram of another process for visualizing log records according to an embodiment of the present invention.

In certain embodiments, the visualization application shown in FIG. 9 can (in additional to visualization) allow more sophisticated analyses to be performed on log records. For example, in one embodiment, the application can treat the log records as comprising one or more data streams (e.g., stream of enqueue events, stream of dequeue events, stream of insert into index events, stream of delete from index events, etc.). Accordingly, the application can provide these log records as inputs into a data stream processing server. Queries can then be run against the data streams and the results can be used by the application for various purposes. FIG. 10 is a flow diagram of a such a process 1000.

At block 1002, one or more events in the log file received at block 802 of process 800 can be provided to a data stream processing server. In one set of embodiments, the data stream processing server can be embedded into the visualization application performing the steps of process 1000. Alternatively, the data stream processing server can be running in a different address space or on a different machine.

At blocks 1004 and 1006, a continuous query can be to be executed against the data streams can be received, and the query can be provided to the data stream processing server for processing. Merely by way of example, once such query may relate to checking the growth of particular queue object. Another type of query may relate to correlating the size of an index to a size of a queue. Yet another type of query may relate to correlating the contents of an index to the contents of a queue. In one set of embodiments, the server can execute this query while the graphical representation of the query plan described in the log records is being animated (per block 806 of process 800).

At block 1008, a result set for the continuous query can be received from the data stream processing server. The result set can then be used to perform a specific action. For example, if the result set contains data satisfying a particular condition, the animation of the query plan can be halted, or an alert can be displayed. In this manner, the continuous query can act as a complex breakpoint condition (e.g., break playback if this condition satisfied). A user can then inspect the contents of various query plan objects to try and determine the cause of any problems that may have occurred during query execution.

It will be appreciated that process 1000 is illustrative and not intended to limit embodiments of the present invention. Steps described as sequential may be executed in parallel, order of steps may be varied, and steps may be modified, combined, added, or omitted. One of ordinary skill in the art would recognize many variations, modifications, and alternatives.

Figure 11:
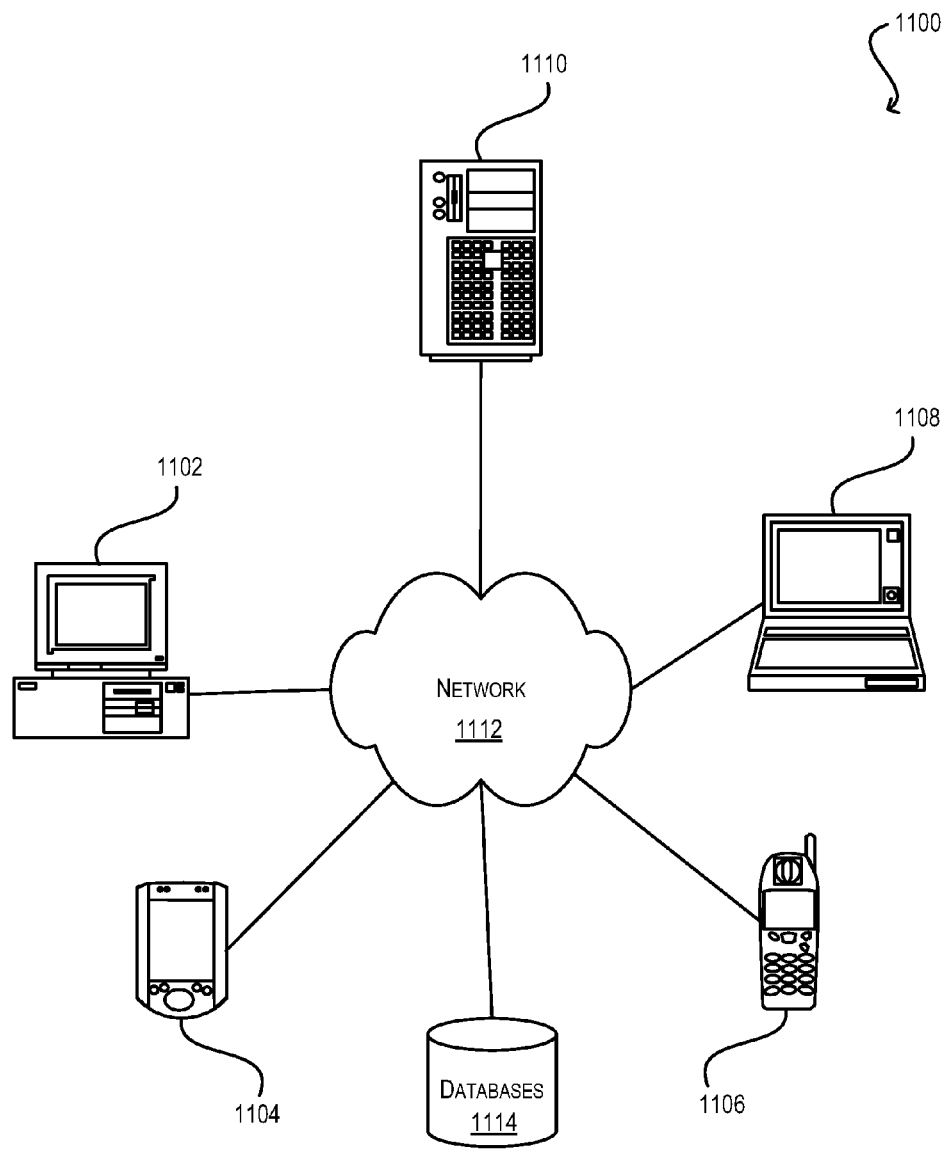
FIG. 11 is a simplified block diagram of a system environment that may be used in accordance with an embodiment of the present invention.

FIG. 11 is a simplified block diagram illustrating a system environment 1100 that may be used in accordance with an embodiment of the present invention. As shown, system environment 1100 includes one or more client computing devices 1102, 1104, 1106, 1108 communicatively coupled with a server computer 1110 via a network 1112. In one set of embodiments, client computing devices 1102, 1104, 1106, 1108 may be configured to run one or more client applications that interact with DSMS 100 of FIGS. 1A and 1B. Further, server computer 1110 may correspond to a machine configured to run DSMS 100. Although system environment 1100 is shown with four client computing devices and one server computer, any number of client computing devices and server computers may be supported.

Client computing devices 1102, 1104, 1106, 1108 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 1102, 1104, 1106, 1108 may be any other electronic device capable of communicating over a network (e.g., network 1112 described below) with server computer 1110.

Server computer 1110 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 1110 may run an operating system including any of those discussed above, as well as any commercially available server operating system. Server computer 1110 may also run any of a variety of server applications and/or mid-tier applications, including web servers, Java virtual machines, application servers, database servers, and the like. As indicated above, in one set of embodiments, server computer 1110 is adapted to run one or more server and/or middle-tier components such as data stream processing server 102 of DSMS 100.

As shown, client computing devices 1102, 1104, 1106, 1108 and server computer 1110 are communicatively coupled via network 1112. Network 1112 may be any type of network that can support data communications using any of a variety of commercially-available protocols, including without limitation TCP/IP, SNA, IPX, AppleTalk, and the like. Merely by way of example, network 1112 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1100 may also include one or more databases 1114. In one set of embodiments, database 1114 can include any other database or data storage component discussed in the foregoing disclosure, such as log configuration database 102, log record database 122, and change management database 124 of FIG. 1B. Database 1114 may reside in a variety of locations. By way of example, database 1114 may reside on a storage medium local to (and/or resident in) one or more of the computers 1102, 1104, 1106, 1108, 1110. Alternatively, database 1114 may be remote from any or all of the computers 1102, 1104, 1106, 1108, 1110 and/or in communication (e.g., via network 1112) with one or more of these. In one set of embodiments, database 1114 may reside in a storage-area network (SAN) familiar to those skilled in the art. Similarly, any necessary files for performing the functions attributed to the computers 1102, 1104, 1106, 1108, 1110 may be stored locally on the respective computer and/or remotely on database 1114, as appropriate. In one set of embodiments, database 1114 is a relational database, such as Oracle 10 g available from Oracle Corporation. In particular embodiment, database 1114 is adapted to store, update, and retrieve data streams in response to CQL-formatted commands received at server computer 1110.

Figure 12:
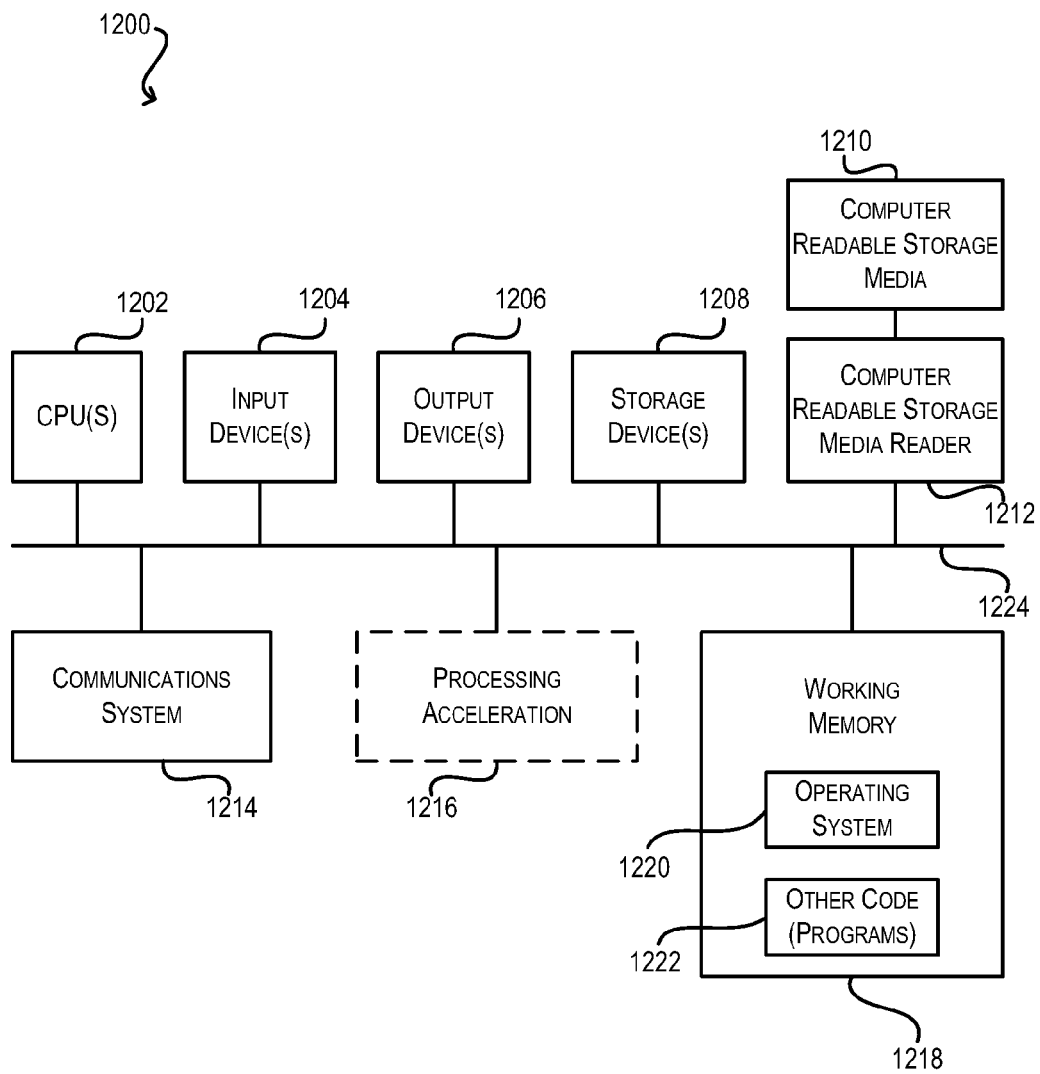
FIG. 12 is a simplified block diagram of a computer system that may be used in accordance with an embodiment of the present invention.

FIG. 12 is a simplified block diagram illustrating physical components of a computer system 1200 that may incorporate an embodiment of the present invention. In various embodiments, computer system 1200 may be used to implement any of the computers 1102, 1104, 1106, 1108, 1110 illustrated in system environment 1100 described above. As shown in FIG. 12, computer system 1200 comprises hardware elements that may be electrically coupled via a bus 1224. The hardware elements may include one or more central processing units (CPUs) 1202, one or more input devices 1204 (e.g., a mouse, a keyboard, etc.), and one or more output devices 1206 (e.g., a display device, a printer, etc.). Computer system 1200 may also include one or more storage devices 1208. By way of example, storage device(s) 1208 may include devices such as disk drives, optical storage devices, and solid-state storage devices such as a random access memory (RAM) and/or a read-only memory (ROM), which can be programmable, flash-updateable and/or the like.

Computer system 1200 may additionally include a computer-readable storage media reader 1212, a communications subsystem 1214 (e.g., a modem, a network card (wireless or wired), an infra-red communication device, etc.), and working memory 1218, which may include RAM and ROM devices as described above. In some embodiments, computer system 1200 may also include a processing acceleration unit 1216, which can include a digital signal processor (DSP), a special-purpose processor, and/or the like.

Computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. Communications system 1214 may permit data to be exchanged with network 1112 of FIG. 11 and/or any other computer described above with respect to system environment 1100.

Computer system 1200 may also comprise software elements, shown as being currently located within working memory 1218, including an operating system 1220 and/or other code 1222, such as an application program (which may be a client application, Web browser, mid-tier application, RDBMS, etc.). It should be appreciated that alternative embodiments of computer system 1200 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code executable by a computer system (such as a computer system 1200) and may be stored on machine-readable storage media. Machine-readable storage media may can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method comprising:
   receiving, at a computer system, logging configuration information specifying a functional area of a data stream processing server to be logged, the functional area to be logged corresponding to a type of query plan object;
   identifying, by the computer system, an object associated with the functional area that has been instantiated by the data stream processing server, the identifying including traversing a query plan generated for a continuous query, and identifying a query plan object in the plurality of query plan objects having the type, the query plan including a plurality of query plan objects; and
   enabling, by the computer system, logging for the object.

2. The method of claim 1 wherein enabling logging for the object comprises:
   storing the logging configuration information for the object; and
   generating one or more log records for the object based on the logging configuration information stored for the object.

3. The method of claim 2 wherein disabling logging for the object comprises deleting the logging configuration information stored for the object.

4. The method of claim 2 wherein the logging configuration information includes a first parameter identifying an event upon which to generate a log record and a second parameter identifying a level of detail for the log record, and
   wherein generating one or more log records for the object comprises:
   upon occurrence of a predefined event related to the object, retrieving the logging configuration information stored for the object;
   determining if the predefined event corresponds to the event identified by first parameter; and
   if the predefined event corresponds to the event identified by the first parameter, generating a log record for the object, the log record having the level of detail identified by the second parameter.

5. The method of claim 1 further comprising:
   determining, by the computer system, if the object is no longer used by the data stream processing server; and
   if the object is no longer used, disabling, by the computer system, logging for the object.

6. The method of claim 5 wherein determining if the object is no longer used comprises determining if the continuous query is dropped.

7. The method of claim 1 wherein the plurality of query plan objects include an operator object and one or more data structure objects associated with the operator object.

8. The method of claim 7 wherein, if logging is enabled for the operator object, logging is automatically enabled for the one or more data structure objects associated with the operator object.

9. The method of claim 1 further comprising:
   identifying another object associated with the functional area, wherein the another object was instantiated by the data stream processing server subsequently to receiving the logging configuration information; and
   enabling logging for the another object.

10. The method of claim 1 wherein the logging configuration information is received from a user and is expressed as a Continuous Query Language (CQL) statement.

11. The method of claim 1 wherein the logging configuration information is received via an invocation of a Java Management Extensions (JMX) Applications Programming Interface (API).

12. The method of claim 1, wherein the plurality of objects includes an additional object, and wherein logging is enabled for the object and logging is disabled for the additional object.

13. A non-transitory machine-readable storage medium having stored thereon program code executable by a computer system, the program code comprising:
    code that causes the computer system to receive logging configuration information specifying a functional area of a data stream processing server to be logged, the functional area to be logged corresponding to a type of query plan object;
    code that causes the computer system to identify an object associated with the functional area that has been instantiated by the data stream processing server, the code that causes the computer system to identify including code that causes the computer system to traverse a query plan generated for a continuous query, and code that causes the computer system to identify a query plan object in the plurality of query plan objects having the type, the query plan including a plurality of query plan objects; and
    code that causes the computer system to enable logging for the object.

14. The machine-readable storage medium of claim 13 wherein the code that causes the computer system to enable logging for the object comprises:
    code that causes the computer system to store the logging configuration information for the object; and
    code that causes the computer system to generate one or more log records for the object based on the logging configuration information stored for the object.

15. The machine-readable storage medium of claim 14 wherein the logging configuration information includes a first parameter identifying an event upon which to generate a log record and a second parameter identifying a level of detail for the log record, and
    wherein the code that causes the computer system to generate one or more log records for the object comprises:
    code that causes the computer system to, upon occurrence of a predefined event related to the object, retrieve the logging configuration information stored for the object;
    code that causes the computer system to determine if the predefined event corresponds to the event identified by first parameter; and
    code that causes the computer system to, if the predefined event corresponds to the event identified by the first parameter, generate a log record for the object, the log record having the level of detail identified by the second parameter.

16. The machine-readable storage medium of claim 13 wherein identifying an object associated with the functional area comprises:

traversing a query plan generated for a continuous query, the query plan including a plurality of query plan objects; and identifying a query plan object in the plurality of query plan objects having the type of query plan object.

17. The machine-readable storage medium of claim 13 wherein the program code further comprises:

code that causes the computer system to identify another object associated with the functional area, wherein the another object was instantiated by the data stream processing server subsequently to receiving the logging configuration information; and code that causes the computer system to enable logging for the another object.

18. The machine-readable storage medium of claim 13 wherein the program code further comprises:

code that causes the computer system to determine if the object is no longer used by the data stream processing server; and code that causes the computer system to, if the object is no longer used, disable logging for the object.

19. A system comprising:

a processor configured to:

receive logging configuration information specifying a functional area of a data stream processing server to be logged, the functional area to be logged corresponding to a type of query plan object;

identify an object associated with the functional area that has been instantiated by the data stream processing server, the identifying including traversing a query plan generated for a continuous query, and identifying a query plan object in the plurality of query plan objects having the type, the query plan including a plurality of query plan objects; and enable logging for the object.

20. The system of claim 19 wherein the processing component is further configured to:

determine if the object is no longer used by the data stream processing server; and if the object is no longer used, disable logging for the object.

\* \* \* \* \*

UNITED STATES PATENT AND TRADEMARK OFFICE
CERTIFICATE OF CORRECTION

PATENT NO. : 8,527,458 B2  Page 1 of 1
APPLICATION NO. : 12/534384
DATED : September 3, 2013
INVENTOR(S) : Park et al.

It is certified that error appears in the above-identified patent and that said Letters Patent is hereby corrected as shown below:

On the Title Page, Item (56)

On page 4, column 2, under other publications, line 16, delete "1Oth" and insert -- 10th --, therefor.

On page 4, column 2, under other publications, line 44, delete "f" and insert -- of --, therefor.

In the Specifications

In column 5, line 65, delete "haven" and insert -- have --, therefor.

In column 17, line 7, delete "application" and insert -- application, --, therefor.

In column 17, line 45, delete "and or" and insert -- and/or --, therefor.

Signed and Sealed this
Twenty-fourth Day of December, 2013

Margaret A. Focarino
*Commissioner for Patents of the United States Patent and Trademark Office*